US012659608B2

(12) United States Patent
Hanzawa et al.

(10) Patent No.: US 12,659,608 B2
(45) Date of Patent: Jun. 16, 2026

(54) IMAGING DEVICE, ELECTRONIC APPARATUS, AND INFORMATION PROCESSING METHOD REPEATEDLY PERFORMING A PRODUCT-SUM OPERATION

(71) Applicant: Sony Semiconductor Solutions Corporation, Atsugi (JP)

(72) Inventors: Katsuhiko Hanzawa, Kanagawa (JP); Daisuke Saito, Kanagawa (JP)

(73) Assignee: Sony Semiconductor Solutions Corporation, Atsugi (JP)

( * ) Notice: Subject to any disclaimer, the term of this patent is extended or adjusted under 35 U.S.C. 154(b) by 197 days.

(21) Appl. No.: 18/294,554

(22) PCT Filed: Mar. 29, 2022

(86) PCT No.: PCT/JP2022/015269
§ 371 (c)(1),
(2) Date: Feb. 2, 2024

(87) PCT Pub. No.: WO2023/021780
PCT Pub. Date: Feb. 23, 2023

(65) Prior Publication Data
US 2025/0113110 A1 Apr. 3, 2025

(30) Foreign Application Priority Data
Aug. 17, 2021 (JP) ................................ 2021-132973

(51) Int. Cl.
| | |
|---|---|
| *H04N 25/46* | (2023.01) |
| *H04N 25/13* | (2023.01) |
| *H04N 25/44* | (2023.01) |
| *H04N 25/47* | (2023.01) |
| *H04N 25/772* | (2023.01) |
| *H04N 25/78* | (2023.01) |

(52) U.S. Cl.
CPC ........... *H04N 25/46* (2023.01); *H04N 25/134* (2023.01); *H04N 25/44* (2023.01); *H04N 25/47* (2023.01); *H04N 25/772* (2023.01); *H04N 25/78* (2023.01)

(58) Field of Classification Search
CPC ...... H04N 25/46; H04N 25/134; H04N 25/44; H04N 25/47; H04N 25/772; H04N 25/78
See application file for complete search history.

(56) References Cited

U.S. PATENT DOCUMENTS

| | | | |
|---|---|---|---|
| 2018/0227551 A1* | 8/2018 | Shishido | ................ H04N 25/78 |
| 2021/0051290 A1 | 2/2021 | Panicacci et al. | |

FOREIGN PATENT DOCUMENTS

| | | |
|---|---|---|
| JP | 2018-125842 A | 8/2018 |
| JP | 2020-113809 A | 7/2020 |

OTHER PUBLICATIONS

International Search Report and Written Opinion mailed on Jun. 28, 2022, received for PCT Application PCT/JP2022/015269, filed on Mar. 29, 2022, 9 pages including English Translation.

* cited by examiner

*Primary Examiner* — Nicholas G Giles
(74) *Attorney, Agent, or Firm* — XSENSUS LLP

(57) ABSTRACT

A product-sum operation can be efficiently performed without increasing a pixel size.

An imaging device includes: a pixel array unit in which a plurality of pixels that perform photoelectric conversion are arranged in directions in two dimensions; and an arithmetic operation unit configured to repeat a product-sum operation by selecting two or more of the pixels that have not been selected and are not adjacent to each other inside the pixel array unit.

21 Claims, 58 Drawing Sheets

CF

CF

23

23

23

IMAGING DEVICE, ELECTRONIC APPARATUS, AND INFORMATION PROCESSING METHOD REPEATEDLY PERFORMING A PRODUCT-SUM OPERATION

CROSS-REFERENCE TO RELATED APPLICATIONS

The present application is based on PCT filing PCT/JP2022/015269, filed Mar. 29, 2022, which claims priority from Japanese Patent Application No. 2021-132973, filed Aug. 17, 2021, the entire contents of each are incorporated herein by reference.

TECHNICAL FIELD

The present disclosure relates to an imaging device, an electronic apparatus, and an information processing method.

BACKGROUND ART

A technology for extracting feature quantities and the like of an image at a high speed by performing a convolution operation process for image data has been proposed (see PTL 1).

In the convolution operation process, a product-sum operation with a filter coefficient is performed in units of pixel blocks each formed from a plurality of pixels, and a process of extracting feature quantities while reducing resolution of image data is performed.

CITATION LIST

Patent Literature

[PTL 1]
JP 2020-113809 A

SUMMARY

Technical Problem

In a convolution operation process, after a product-sum operation process in which each pixel signal inside a pixel block and a corresponding filter coefficient are multiplied together, and results thereof are added together is performed, a product-sum operation process in which each pixel signal inside a new pixel block acquired by horizontally or vertically shifting the pixel block by a determined number of pixels and a corresponding filter coefficient are multiplied together, and results thereof are added together is performed. For this reason, a product-sum operation process between each pixel signal inside a pixel block and a corresponding filter coefficient is performed a plurality of number of times. In this way, each pixel signal is associated with a corresponding filter coefficient, and there is a problem in that a filter coefficient cannot be changed for each pixel block.

In addition, since each pixel signal is used for a product-sum operation process performed a plurality of number of times, a storage unit is required for storing a pixel signal read from a pixel until the product-sum operation process performed a plurality of number of times ends. Alternatively, a reading circuit that parallelizes and outputs one pixel signal for the product-sum operation process performed a plurality of number of times is necessary. In this way, when the product-sum operation process is performed for each pixel signal a plurality of number of times, the pixel size becomes large.

Thus, the present disclosure provides an imaging device, an electronic apparatus, and an information processing method capable of efficiently performing a product-sum operation without increasing a pixel size.

Solution to Problem

In order to solve the problems described above, according to the present disclosure, there is provided an imaging device including a pixel array unit in which a plurality of pixels that perform photoelectric conversion are arranged in directions in two dimensions; and an arithmetic operation unit configured to repeat a product-sum operation by selecting two or more of the pixels that have not been selected and are not adjacent to each other inside the pixel array unit.

The pixel array unit may be divided into a plurality of macro-pixels having two or more of the pixels adjacent to each other as its unit, and the arithmetic operation unit may repeat a process of performing a product-sum operation by selecting one pixel that has not been selected and is not adjacently disposed from each of two or more of the macro pixels.

The arithmetic operation unit may perform a convolution operation with a filter in units of pixel blocks including two or more of the macro pixels and repeat a process of performing a product-sum operation with corresponding filter coefficients inside the filter by sequentially selecting pixels that have not been selected and are not adjacently disposed from the macro pixels inside the pixel block.

When a size of the filter is N in a first direction and is M in a second direction intersecting with the first direction, a shift amount of the pixels in the first direction is K, and a shift amount of the pixels in the second direction is L (here, N, M, K, and L are integers equal to or greater than 1), the number of pixels inside the macro pixel may be equal to or greater than $(N/K) \times (M/L)$.

Color filters arranged in association with the pixels may be further included.

Each of the color filters may have a plurality of color filter units that transmit light of which wavelength bands are different from each other.

Color filters arranged in association with the pixels may be further included, in which the color filter has a color filter unit for each of the macro pixels, and two of the color filter units corresponding to two of the macro pixels adjacent to each other may have different wavelength bands of light which are transmitted.

The color filter may include at least one of a color filter unit that transmits light of a visible light wavelength band, a color filter unit that transmits light of an infrared light wavelength band, and a color filter unit that performs polarization control.

The macro pixel may include two or more photoelectric conversion units arranged in a direction in which signal lines that transmit pixel signals extend; two or more transfer transistors connected to the two or more photoelectric conversion units; and two or more reading circuits connected to the two or more transfer transistors, the two or more reading circuits may be connected to the signal line that is configured to be common, and the two or more reading circuits may each output the pixel signals to the signal lines at different timings.

The macro pixel may include two or more photoelectric conversion units arranged in a direction in which signal lines that transmit pixel signals extend; two or more transfer transistors connected to the two or more photoelectric conversion units; and two or more reading circuits connected to the two or more transfer transistors, the two or more reading circuits may be each connected to the separate signal lines, and the two or more reading circuits may output the pixel signals in parallel to the corresponding signal lines.

The macro pixel may include a plurality of photoelectric conversion units arranged in each of a first direction and a second direction intersecting with each other; and a plurality of signal lines extending in the second direction, and the plurality of photoelectric conversion units arranged in different stages in the second direction may output pixel signals in parallel to corresponding signal lines.

The macro pixel may include two or more photoelectric conversion units arranged in a direction in which signal lines that transmit pixel signals extend; two or more transfer transistors connected to the two or more photoelectric conversion units; and a reading circuit shared by the two or more photoelectric conversion units and the two or more transfer transistors.

The macro pixel may include a plurality of photoelectric conversion units arranged in each of a first direction and a second direction intersecting with each other; a plurality of signal lines extending in the second direction; and a plurality of reading circuits connected to the plurality of signal lines, and each of the plurality of reading circuits may be shared by the plurality of photoelectric conversion units arranged along the corresponding signal lines.

The macro pixel may include a plurality of photoelectric conversion units arranged in each of a first direction and a second direction intersecting with each other; a plurality of signal lines extending in the second direction; and one reading circuit connected to the plurality of signal lines and shared by all the pixels of the inside of the macro pixel.

Inside the pixel, the pixel signal acquired through photoelectric conversion may be weighted for a convolution operation and then output.

An analog-to-digital converter that converts the pixel signal acquired through photoelectric conversion into a digital pixel signal may be further included, in which the arithmetic operation unit may perform a product-sum operation for the digital pixel signal.

An analog-to-digital converter that converts a signal acquired by performing a product-sum operation for the pixel signal acquired through photoelectric conversion from analog to digital may be further included.

The pixel may output a digital pixel signal acquired by performing analog-to-digital conversion of the pixel signal.

The pixel may output the pixel signal corresponding to a luminance change.

According to the present disclosure, there is provided an electronic apparatus including an imaging device configured to output a pixel signal acquired through photoelectric conversion; and a signal processing unit configured to perform signal processing for the pixel signal, in which the imaging device includes a pixel array unit in which a plurality of pixels that perform photoelectric conversion are arranged in directions in two dimensions; and an arithmetic operation unit configured to repeat a process of performing a product-sum operation by selecting two or more of the pixels that have not been selected and are not adjacent to each other inside the pixel array unit.

An information processing method in which a process of performing a product-sum operation by selecting two or more pixels that have not been selected and are not adjacent to each other inside a pixel array unit, in which a plurality of pixels that perform photoelectric conversion are arranged in directions in two dimensions, is repeated.

DESCRIPTION OF EMBODIMENTS

Hereinafter, an imaging device, an electronic apparatus, and an information processing method according to an embodiment will be described with reference to the drawings. Hereinafter, although major components of an imaging device, an electronic apparatus, and an information processing method will be focused on in description, components and functions not illustrated or described may be present in the imaging device, the electronic apparatus, and the information processing method. The following description does not exclude components or functions that are not illustrated or mentioned.

Figure 1:
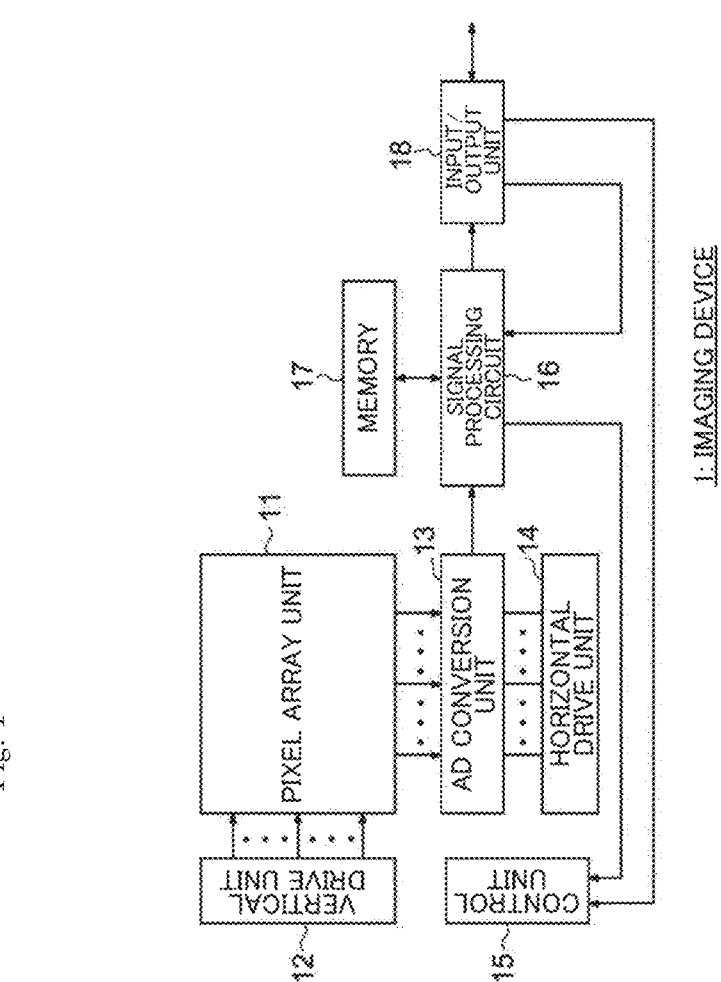
FIG. 1 is a block diagram illustrating a schematic configuration of a solid-state imaging element according to the present disclosure.

FIG. 1 is a block diagram illustrating a schematic configuration of a solid-state imaging element according to the present disclosure.

The imaging device 1 illustrated in FIG. 1 is configured to have a pixel array unit 11 in which a plurality of pixels (not illustrated) are arranged in a matrix pattern and peripheral circuit units disposed in the vicinity thereof. As the peripheral circuit units, a vertical drive unit 12, an AD conversion unit 13, a horizontal drive unit 14, a control unit 15, a signal processing circuit 16, a memory 17, an input/output unit 18, and the like are included.

Each of pixels that are two-dimensionally disposed inside the pixel array unit 11 is configured to have a photodiode as a photoelectric conversion unit and a plurality of pixel transistors. For example, the plurality of pixel transistors are MOS transistors such as a transfer transistor, an amplification transistor, a selection transistor, a reset transistor, and the like.

The vertical drive unit 12, for example, is configured using a shift register and drives pixels in units of rows by supplying a drive pulse to each pixel of the pixel array unit 11 through a pixel drive wiring (not illustrated). In other words, the vertical drive unit 12 sequentially selectively scans the pixels of the pixel array unit 11 in a vertical direction in units of rows and supplies a pixel signal based on signal electric charge generated in accordance with an amount of incident light in the photodiode of each pixel to the AD conversion unit 13 through a vertical signal line Vsig (not illustrated) that is disposed to be common in units of columns.

The AD conversion unit 13 performs a Correlated Double Sampling (CDS) process for eliminating pixel-specific fixed pattern noise and an AD conversion process for a pixel signal output from each of pixels of one row of the pixel array unit 11.

The horizontal drive unit 14, for example, is configured using a shift register and, by sequentially outputting horizontal scanning pulses, causes the AD conversion unit 13 to sequentially output maintained (digital) pixel signals after AD conversion of pixels of a predetermined one row to the signal processing circuit 16.

The control unit 15 receives a clock signal input from the outside and data instructing an operating mode and the like and controls the operation of the whole imaging device 1. For example, the control unit 15 generates a vertical synchronization signal, a horizontal synchronization signal, and the like on the basis of a clock signal that has been input and supplies the generated signals to the vertical drive unit 12, the AD conversion unit 13, the horizontal drive unit 14, and the like.

The signal processing circuit 16 performs various kinds of digital signal processing such as a black level adjusting process, a column deviation correcting process, a de-mosaic process, and the like as necessary for a pixel signal supplied from the AD conversion unit 13 and supplies a resultant signal to the input/output unit 18. Depending on an operating mode, there are also cases in which the signal processing circuit 16 performs only buffering and outputs the pixel signal. The memory 17 stores data of parameters and the like required for signal processing performed by the signal processing circuit 16. In addition, the memory 17, for example, includes a frame memory used for storing an image signal in processes such as a de-mosaic process and the like. The signal processing circuit 16 can store parameters and the like input from an external image processing device through the input/output unit 18 in the memory 17 or can appropriately select signal processing on the basis of an instruction from an external image processing device and perform the selected signal processing.

The input/output unit 18 outputs image signals sequentially input from the signal processing circuit 16 to an external image processing device, for example, an image signal processor (ISP) of a later stage or the like. In addition, the input/output unit 18 supplies signals and parameters input from an external image processing device to the signal processing circuit 16 and the control unit 15.

The imaging device 1 is configured as above and, for example, is a CMOS image sensor called a column AD system in which a CDS process and an AD conversion process are performed for each pixel column.

The imaging device 1 illustrated in FIG. 1 is configured to perform a part of an arithmetic operation process (hereinafter, it may be referred to also as a convolution operation process) of a convolution neural network (hereinafter, referred to as a convolution neural network (CNN)) using an image (generated image) generated in accordance with light reception of the pixel array unit 11 and be able to output a result thereof to the outside.

First, an overview of the CNN will be described with reference to FIGS. 2 and 3.

Figure 2:
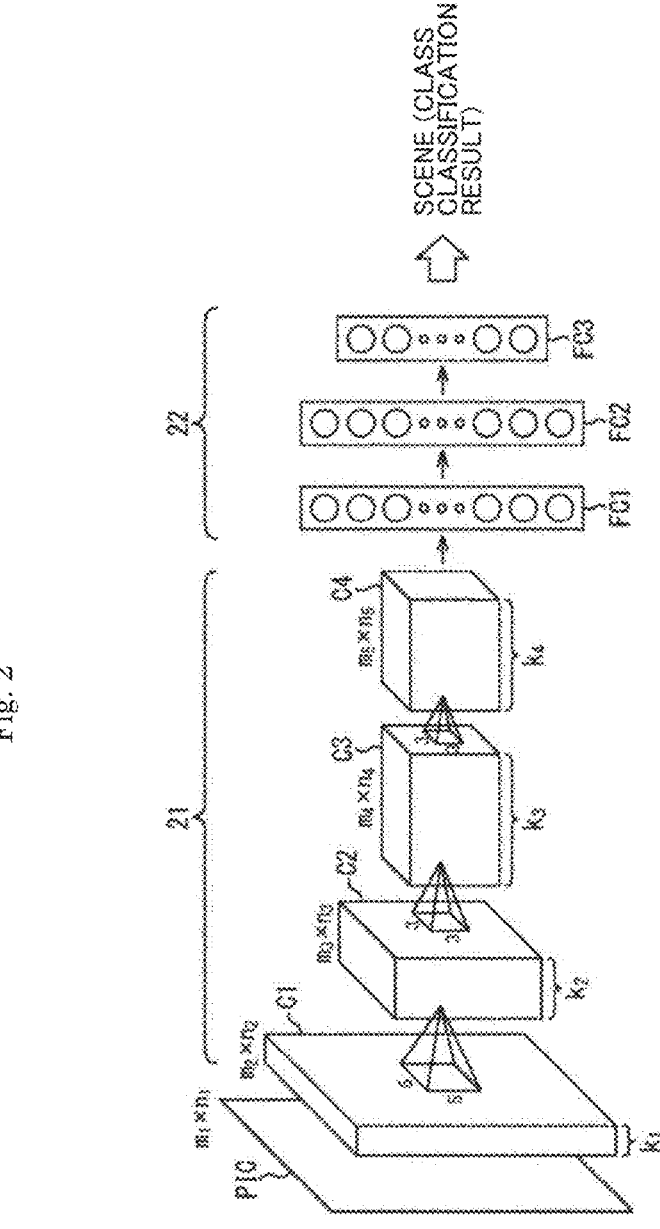
FIG. 2 is a diagram illustrating an example of a CNN configuration that outputs a class classification result from an input image.

FIG. 2 is a diagram illustrating an example of a CNN configuration that outputs a class classification result from an input image.

The CNN illustrated in FIG. 2, for example, for an input image PIC, can perform a process of outputting a scene corresponding to the input image PIC from a plurality of scenes as a class classification result.

For example, the CNN illustrated in FIG. 2 is composed of a feature quantity extractor 21 formed from a plurality of stages of convolution layers and pooling layers and an identifying device 22 that is a neural network (a fully-coupled layer). In the feature quantity extractor 21 of a previous stage of the identifying device 22, features of an input image are extracted using the convolution layers and the pooling layers.

The feature quantity extractor 21 illustrated in FIG. 2 is formed from convolution layers and pooling layers of four stages and, when a convolution layer of a first stage, a convolution layer of a second stage, a convolution layer of a third stage and a convolution layer of a fourth stage from a side close to an input image PIC are respectively denoted by C1, C2, C3, and C4, toward a later stage, the resolution of a processing image becomes lower, and the number of characteristic maps (the number of channels) becomes larger. More specifically, when the resolution of the input image PIC is m1×n1, the resolution of the convolution layer C1 of the first stage is m2×n2, the resolution of the convolution layer C2 of the second stage is m3×n3, the resolution of the convolution layer C3 of the third stage is m4×n4, and the resolution of the convolution layer C4 of the fourth stage is m5×n5 (here, m1×n1<m2×n2≤m3×n3≤m4×n4≤m5×n5).

In addition, the number of characteristic maps of the convolution layer C1 of the first stage is k1, the number of characteristic maps of the convolution layer C2 of the second stage is k2, the number of characteristic maps of the convolution layer C3 of the third stage is k3, and the number of characteristic maps of the convolution layer C4 of the fourth stage is k4 (k1≤k2≤k3≤k4; here k1 to k4 are not the same). In FIG. 2, illustration of the pooling layer is omitted.

The identifying device 22 is composed of an input layer FC1, one or more layers of hidden layers FC2, and an output layer FC3, and all the nodes of each layer are coupled with all the nodes of a layer of a later stage.

The CNN can be applied not only to class classification but also to a case in which image information such as area division of an image, hit map output, or the like is output.

Figure 3:
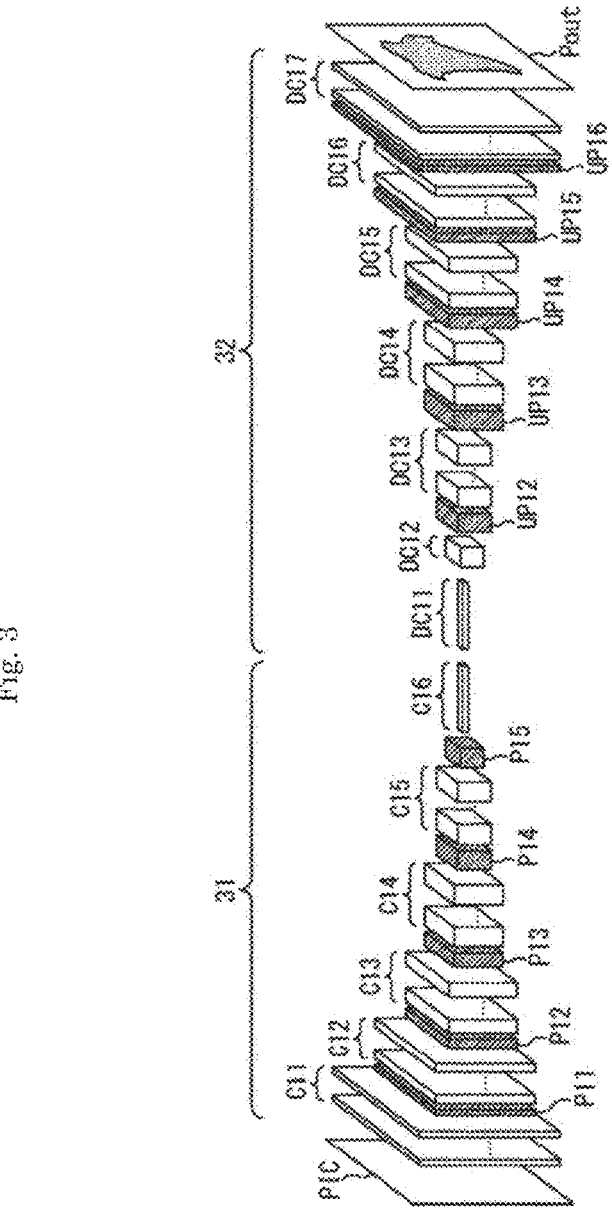
FIG. 3 is a diagram illustrating an example of a CNN configuration that outputs an area image acquired by identifying an area of a desired object included in an input image as a result of identification.

FIG. 3 is a diagram illustrating an example of the configuration of a CNN that outputs an area image acquired by identifying an area of a desired object included in an input image as an identification result.

For example, the CNN illustrated in FIG. 3 performs a process of outputting an extracted image Pout in which areas of desired objects (for example, a person, an animal, a building, and the like) included in an input image PIC are extracted for the input image PIC.

The CNN illustrated in FIG. 3 is configured using a convolution network unit 31 and a deconvolution network unit 32 and is configured not to have a fully-coupled layer.

In the convolution network unit 31, from a side close to an input image PIC, a convolution layer C11 of and a pooling layer P11 of a first stage to a convolution layer C15 and a pooling layer P15 of a fifth stage and a convolution layer C16 of a sixth stage are disposed in the mentioned order, and, a process of a filter F-ring process using a predetermined filter coefficient and a down-sampling process using a pooling layer are performed in each convolution layer.

In the deconvolution network unit 32, from a side close to the convolution network unit 31, a deconvolution layer DC11 of a first stage, a deconvolution layer DC12 and an unpooling layer UP12 of a second stage to a deconvolution layer DC16 and an unpooling layer UP16 of a sixth stage, and a deconvolution layer DC17 of a seventh stage are disposed in the mentioned order, and, a filter F-ring process using a predetermined filter coefficient and an up-sampling process using the unpooling layer are performed in each deconvolution layer.

As the configuration of the CNN, other than the configuration described with reference to FIGS. 2 and 3, various network configurations may be considered in accordance with a target desired to be recognized by the CNN, a use, and a purpose (for example, recognition of a scene that is being captured, detection of position and kinds of various objects, a position and an expression posture of a face, personal identification, and the like).

However, layers of the first stage and the second stage close to the input image PIC frequently have a distribution of filter coefficients extracting original image feature quantities close to contrast/edge detection and the like, and there are many cases in which image feature quantities can be provided using a common filter coefficient/filter size.

Thus, in the imaging device 1 illustrated in FIG. 1, operations of a convolution layer and a pooling layer on a side close to the input image PIC that can be commonly used for various CNNs, for example, processes of the convolution layer and the pooling layer of the first stage and processes of the convolution layers and the pooling layers of the first stage and the second stage are performed in advance inside the imaging device 1, and results after the processes are configured to be able to be output to an external image processing device. By executing a part of the CNN operation in advance on a sensor of the imaging device 1, an image signal of resolution lower than the resolution of the pixel array unit 11 can be output, and thus reduction of a bus band of a communication path with a device of a later stage and suppression of power consumption can be realized.

Generally, as a filter size of the CNN, a square is used from the symmetry, and, in this specification, the filter size is N×N. At this time, in a case in which a product-sum operation with a filter is performed by shifting a pixel block that is a unit of a convolution operation by K pixels, each pixel inside a pixel block is accessed N/K times. In a case in which N/K is indivisible, there are a case in which each pixel is accessed only a number of times corresponding to a rounded-up integer and a case in which each pixel is accessed only a number of times corresponding to a rounded-down integer. For example, in a case in which N=3 and K=1, the pixel is accessed N/K=3 times, and in a case in which N=3 and K=2, N/K=1.5, and thus there are a case in which the pixel is accessed twice and a case in which the pixel is accessed once. In a case in which N=3 and K=3, the pixel is accessed N/K=1 time.

Generally, in reading a pixel, although electrons or holes generated in photoelectric conversion are read, in a CMOS image sensor, for offset cancel, a CDS process is performed. In the CDS process, when one pixel is read, a reset signal and an optical signal are read as a pair, and thus destructive reading is performed, and a pixel signal of the same pixel cannot be read a plurality of number of times. For this reason, by disposing a plurality of amplification transistor inside a pixel and outputting pixel signals in parallel with each other, a product-sum operation in a pixel block shifted by K pixels can be performed. However, in this case, filter coefficients cannot be made different before and after K-pixel shifting. In addition, although a case in which a memory storing a pixel signal is disposed inside a pixel may be also considered, the pixel size becomes large in that case.

Thus, the imaging device 1 according to this embodiment has features in which each piece of pixel data inside a pixel block that is a unit of a convolution operation does not need to be read a plurality of times, and filter coefficients are configured not to be able to be changed for each pixel block.

More specifically, the imaging device 1 according to this embodiment includes an arithmetic operation unit that selects two or more pixels 10 that have not been selected and are not adjacent to each other inside the pixel array unit 11 and repeats a product-sum operation. As will be described below, the arithmetic operation unit may be disposed inside the pixel 10 or may be disposed in the AD conversion unit 13 connected to a signal line that transmits a pixel signal read from the pixel 10 or the like.

Figure 4:
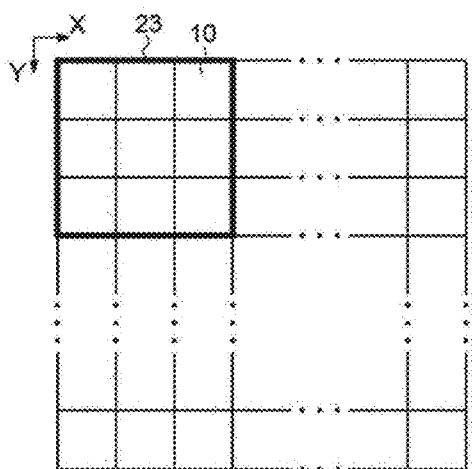
FIG. 4 is a diagram schematically illustrating a row of pixels inside a pixel array unit.

FIG. 4 is a diagram schematically illustrating a row of pixels 10 inside the pixel array unit 11. The pixel array unit 11 has a plurality of pixels 10 disposed in a first direction X and a second direction Y. In this embodiment, n×m pixels 10 (here, n and m are integers equal to or greater than 1) that are disposed to be adjacent to each other are set as a macro pixel 23. In the example illustrated in FIG. 4, the macro pixel 23 is composed of 3×3 pixels 10. The macro pixel 23 can be referred to as a pixel unit.

Figure 5:
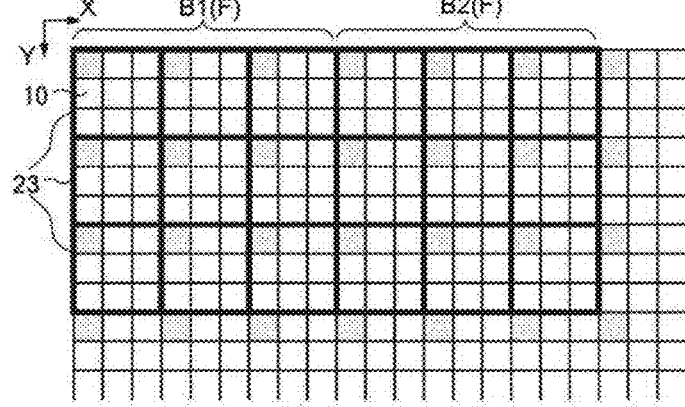
FIG. 5 is a diagram illustrating a pixel block illustrating a unit of a convolution operation.

FIG. 5 is a diagram illustrating pixel blocks B1 and B2 representing units of convolution operations. Each of the pixel blocks B1 and B2 is composed of a total of nine pixels 10 that have been read by selecting one pixel 10 from each of 3×3 macro pixels 23 at each time. The selected pixels 10 are not adjacent to each other and have a space of at least one pixel 10 or more. In the example illustrated in FIG. 5, an example in which a pixel signal is read by selecting each pixel 10 of each macro pixel 23 that is disposed at an upper left corner is illustrated. A product-sum operation is performed between each of the pixel blocks B1 and B2 illustrated in FIG. 5 and a 3×3 filter F. Here, a product-sum operation is a process of multiplying pixel signals of pixels 10 inside a pixel block with corresponding filter coefficients of the inside of the filter F and adding respective multiplication results. In accordance with this, nine pixels 10 can be compressed to one pixel 10.

In FIG. 5, although two pixel blocks B1 and B2 are illustrated in the first direction X, a plurality of pixel blocks of the same size are disposed in the first direction X and the second direction Y, and a product sum operation with a filter F is performed using each pixel block as a unit. The filter F has a total of 9 3×3 filter coefficients and is disposed to overlap each pixel block.

Figure 6:
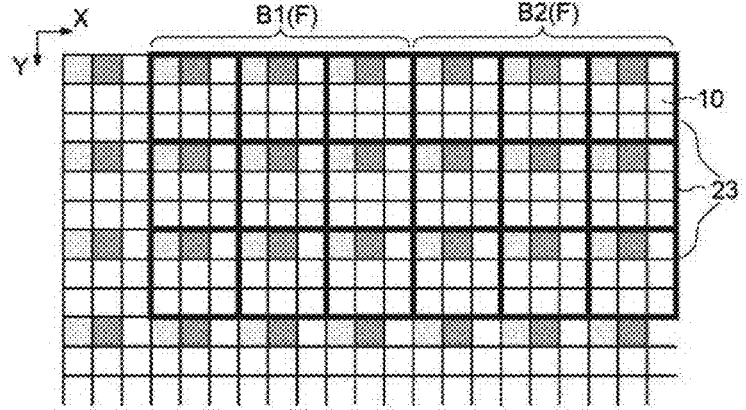
FIG. 6 is a diagram illustrating a state in which a filter is shifted by one macro pixel.

When product-sum operations corresponding to the entire area (also referred to as one frame) of the pixel array unit 11 are completed, as illustrated in FIG. 6, the filter F is shifted by one macro pixel in the first direction (a rightward direction) X, and a product-sum operation with an overlapping pixel block is performed again. At this time, a pixel 10 shifted to the right side by one from the upper left corner of the inside each macro pixel 23 is selected, and a product-sum operation between a read pixel signal and filter coefficients is performed.

Thereafter, similarly, the filter F is shifted to the first direction X (the rightward direction) X by one macro pixel, and pixels 10, which have not been selected, not adjacent to each other among the macro pixels 23 of the inside of a pixel block are sequentially selected, and each pixel signal is read, and a product-sum operation with filter coefficients is performed. In accordance with this, three pixels 10, which are aligned in the first direction X, of each macro pixel 23 of the inside of the pixel block have been selected.

Figure 7:
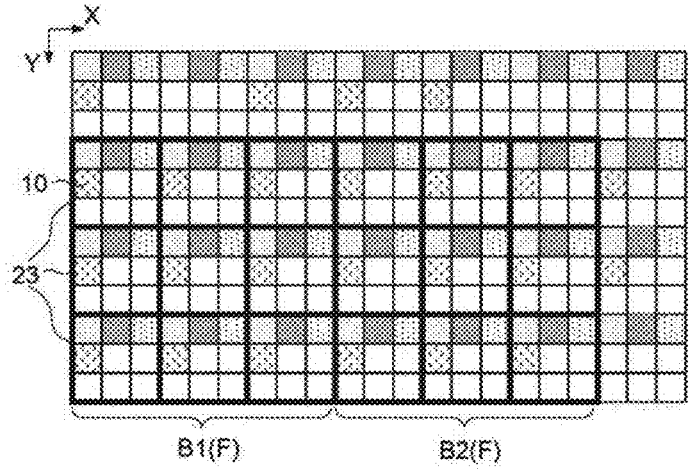
FIG. 7 is a diagram illustrating a state in which the filter is further shifted by one macro pixel.

Next, as illustrated in FIG. 7, the filter F is shifted in the second direction Y (a downward direction) Y by one macro pixel, a pixel signal is read by selecting a pixel 10 of a left end in a second row of each macro pixel 23 of the inside of the pixel block, and a product-sum operation with corresponding filter coefficients is performed.

Thereafter, the filter F is shifted in the first direction X (the rightward direction) X by each one macro pixel, and a similar product-sum operation is sequentially performed.

In this way, in the imaging device according to this embodiment, when one pixel 10 is selected from each macro pixel 23 of the inside of the pixel block at each time, pixels 10, which have not been selected, not adjacent to each other are selected. Then, product-sum operations between nine pixel signals that have been selected and read and corresponding filter coefficients are performed, and the filter F is shifted in the first direction X or the second direction Y by one macro pixel, and a similar product-sum operation is repeated.

In accordance with this, when a convolution operation is performed, the same pixel 10 is not selected a plurality of number of times. Thus, a memory storing a pixel signal read from each pixel 10 does not need to be provided, and a plurality of amplification transistors that amplify pixel signals read from pixels 10 in parallel do not need to be provided. Thus, according to this embodiment, the size of the pixel 10 can be configured to be small. In addition, when a product-sum operation is repeated, the same pixel 10 is not read duplicated, and thus, a product-sum operation can be performed by selecting a different filter coefficient every time the product-sum operation is repeated by shifting the filter F, and a degree of freedom of the convolution operation can be increased.

As described above, when a convolution operation is performed, it is necessary to repeat a product-sum operation while shifting the filter F in the first direction X or the second direction Y. A plurality of kinds of a shift amount and a shift direction of the filter F may be considered.

Figure 8A:
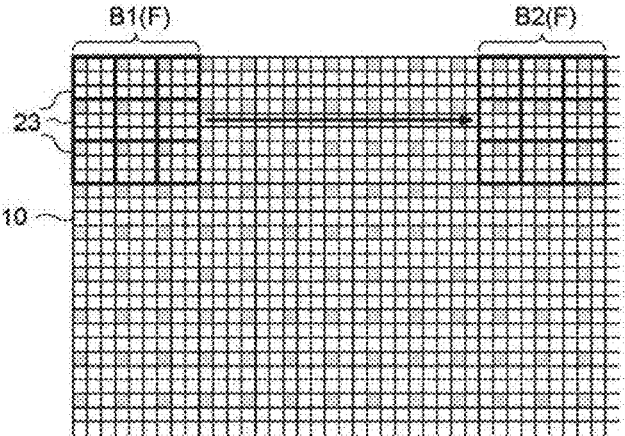
FIG. 8A is a diagram illustrating an example in which a filter is shifted in a dot sequence.

FIG. 8A is a diagram illustrating an example in which the filter F is shifted in a dot sequence. In the example illustrated in FIGS. 4 and 5, although the filter F is shifted in the first direction X or the second direction Y by one macro pixel, the shift amount is arbitrary. FIG. 8A illustrates an example in which the filter F is shifted in the first direction X by a plurality of macro pixels set in advance.

Figure 8B:
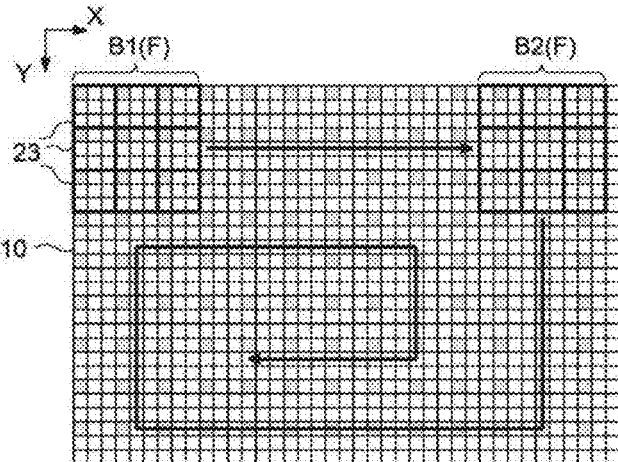
FIG. 8B is a diagram illustrating an example in which a filter is shifted in a trajectory describing a circle.

FIG. 8B is a diagram illustrating an example in which the filter F is shifted in a trajectory describing a circle. In FIG. 8B, although the filter F is shifted in a clockwise direction, the filter F may be shifted in a counterclockwise direction.

Figure 8C:
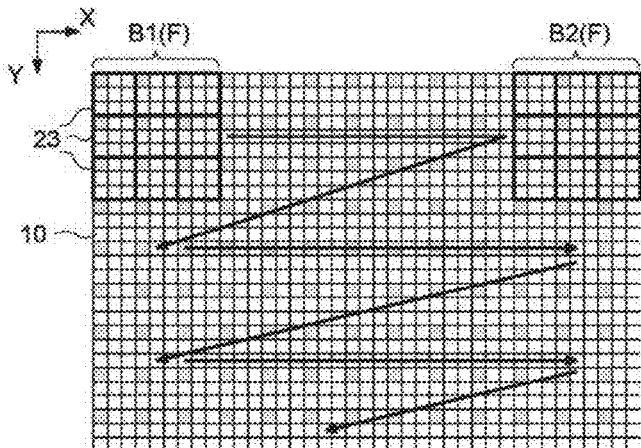
FIG. 8C is a diagram illustrating an example in which a filter is shifted in a zigzag pattern from a first direction to a second direction.

FIG. 8C is a diagram illustrating an example in which the filter F is shifted in a zigzag pattern from the first direction X to the second direction Y.

Figure 8D:
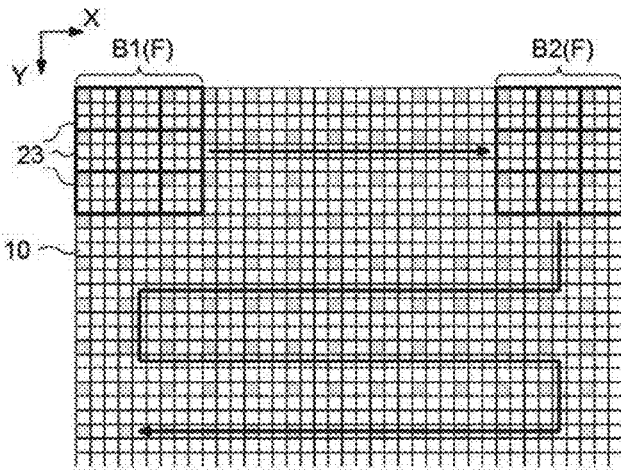
FIG. 8D is a diagram illustrating an example in which a filter is shifted in the form of a single stroke of a brush.

FIG. 8D is a diagram illustrating an example in which the filter F is shifted in the form of a single stroke of a brush. Although the filter F is shifted in the form of a single stroke of a brush in FIGS. 8B and 8C, in FIG. 8D, the filter F is shifted in the form of a single stroke of a brush so as to described an arbitrary trajectory.

FIGS. 8A to 8D merely illustrate some specific examples in which a pixel block is not shifted, and a pixel block may be shifted in a direction other than those illustrated in the drawings.

In FIGS. 5 to 7, although an example in which a product-sum operation with filter coefficients is performed by reading pixel signals by selecting one pixel 10 from each macro pixel 23 of the inside of a pixel block at each time has been illustrated, by simultaneously reading a plurality of pixel signals of the inside of the same pixel 10, product-sum operations with different filter coefficients can be performed in parallel.

In the example illustrated in FIGS. 5 to 7, although a product-sum operation is repeated while shifting the filter F in the first direction X and the second direction Y by one macro pixel, product-sum operations with a plurality of filters F for which methods for shifting are different from each other may be performed in parallel.

Figure 9A:
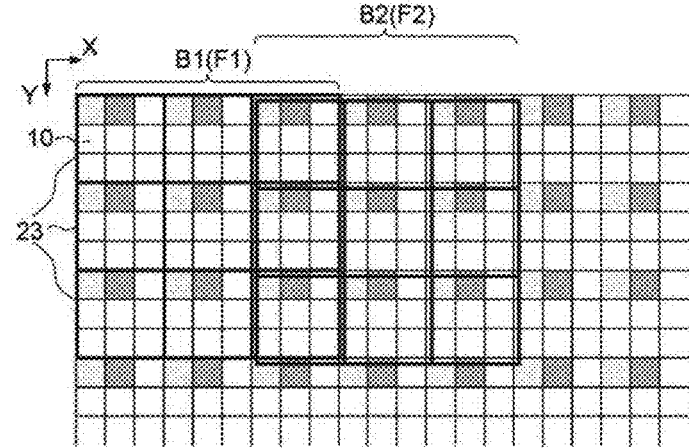
FIG. 9A is a diagram illustrating an example in which a product sum operation using a first filter and a product sum operation using a second filter, which is shifted from the first filter by two macro pixels in a first direction X, are performed in parallel.

FIG. 9A illustrates an example in which a product-sum operation using a first filter F1 and a product-sum operation using a second filter F2 acquired by shifting from the first filter F1 in the first direction X by two macro pixels are performed in parallel. In this case, two pixels 10 are selected from each macro pixel 23, and pixel signals thereof are read in parallel.

Figure 9B:
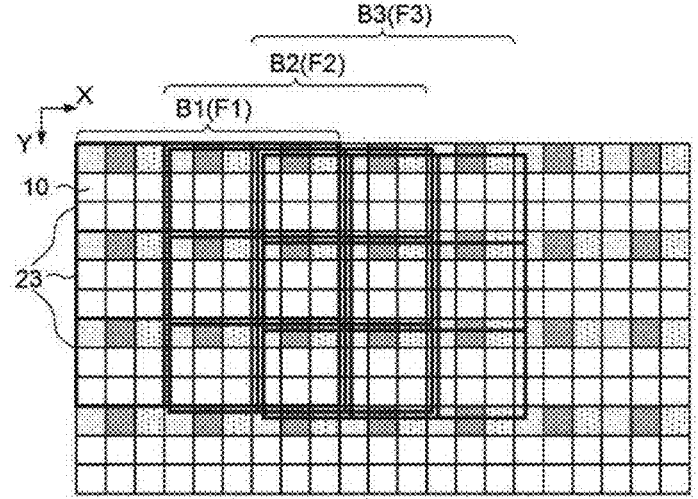
FIG. 9B is a diagram illustrating an example in which product sum operations using first to third filters are performed in parallel.

FIG. 9B illustrates an example in which a product-sum operation using a third filter F3 acquired by shifting from the first filter F in the first direction X by one macro pixel is performed in parallel with product sum operations using the first filter F and the second filter F2 illustrated in FIG. 9A. In this case, three pixels 10 are selected from each macro pixel 23, and pixel signals thereof are read in parallel.

In the description presented above, although whether or not each pixel 10 of the inside of the pixel array unit 11 identifies a color (a wavelength of incident light) has not been described, an imaging device according to this embodiment may perform imaging according to an optical intensity (luminance) of a single light wavelength band or may perform imaging with a color being identified. In a case in which imaging with a color being identified is performed, a color filter CF is disposed on a light incident face side of the pixel array unit 11. In color arrangement of the color filter CF, various forms may be considered.

Figure 10A:
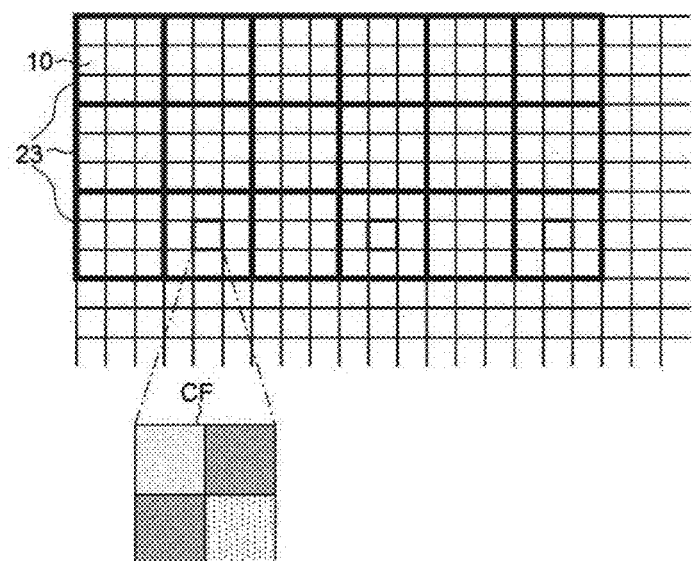
FIG. 10A is a plan view illustrating a first example of a color filter having 2×2 subpixels.
Figure 10B:
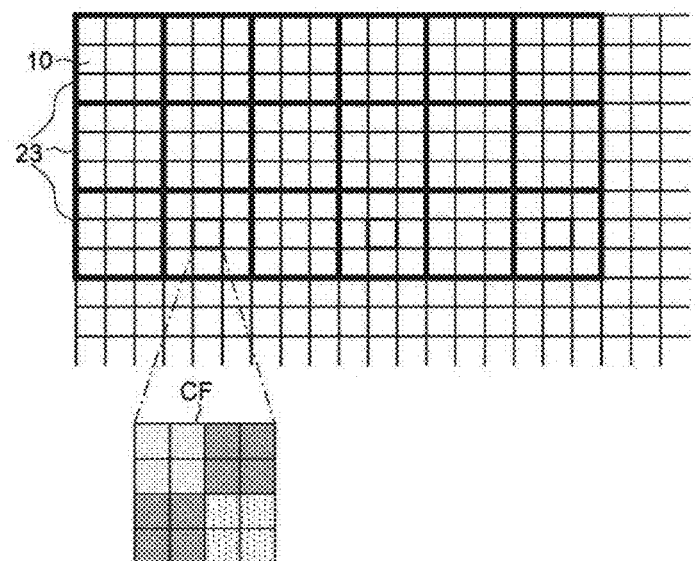
FIG. 10B is a plan view illustrating a first example of a color filter having 4×4 subpixels.
Figure 10C:
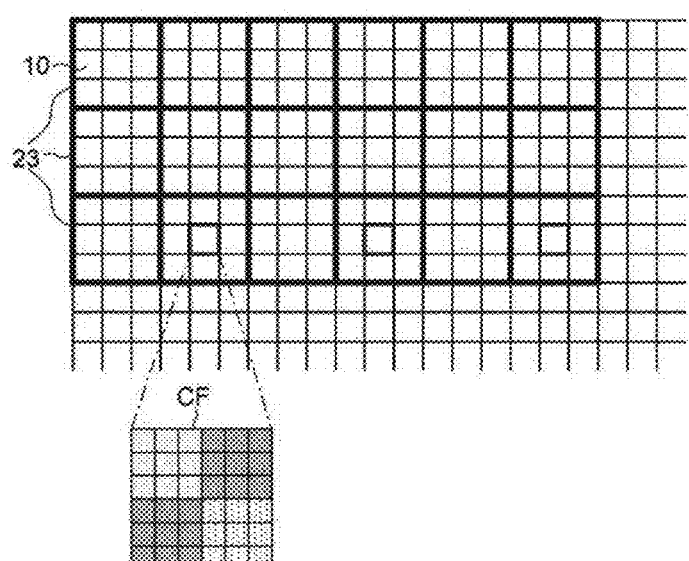
FIG. 10C is a plan view illustrating a first example of a color filter having 6×6 subpixels.

FIGS. 10A, 10B, and 10C are plan views illustrating a first example of a color filter CF. The color filter CF illustrated in FIGS. 10A to 10C has four color filter units for every pixel 10 of the inside of a macro pixel 23. Two color filter units among the four color filter units are green color filter units, and the remaining two color filter units are red and blue color filter units. FIG. 10A illustrates an example in which each pixel 10 is divided into 2×2 subpixels, FIG. 10B illustrates an example in which each pixel 10 is divided into 4×4 subpixels, and FIG. 10C illustrates an example in which each pixel 10 is divided into 6×6 subpixels. In this way, although an example in which the color filter CF illustrated in FIGS. 10A to 10C is a Bayer array is illustrated, a color array other than the Bayer array may be used.

In the examples illustrated in FIGS. 10A to 10C, each pixel 10 corresponds to four color filter units and has 4, 16, or 36 photoelectric conversion units. In a case in which a product-sum operation with filter coefficients is performed, pixel signals acquired by composing pixel signals photo-electrically converted by such a photoelectric conversion unit may be multiplied by filter coefficients, or by preparing a filter coefficient for each color in advance, a product-sum operation with a filter coefficient corresponding to a pixel signal for each color may be performed.

Figure 11:
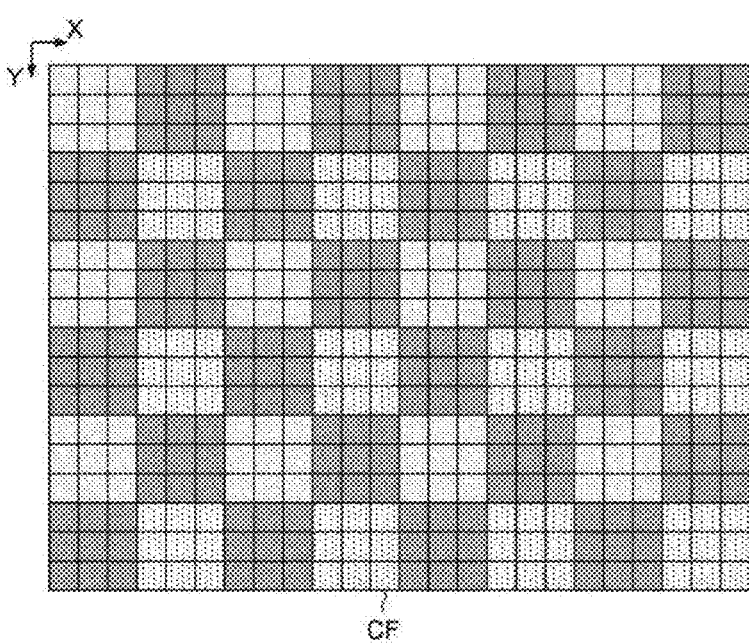
FIG. 11 is a plan view illustrating a second example of a color filter.

FIG. 11 is a plan view illustrating a second example of a color filter CF. The color filter CF illustrated in FIG. 11 has a color filter unit of a size and a color matching each pixel 10 of the inside of the macro pixel 23, and the arrangement of colors is a Bayer array. Colors of color filter units corresponding to macro pixels 23 adjacent to each other are different from each other. As a filter F used for a convolution operation, by using the filter F selecting a discrete pixel 10 as described above, product-sum operations can be performed with filter coefficients by selecting pixels 10 of the same color. In FIG. 11, since color filter units of the same color are disposed in the first direction X and the second direction Y, product-sum operations with filter coefficients can be performed by consecutively reading pixel signals corresponding to the color filter units of the same color from each pixel 10.

Figure 12A:
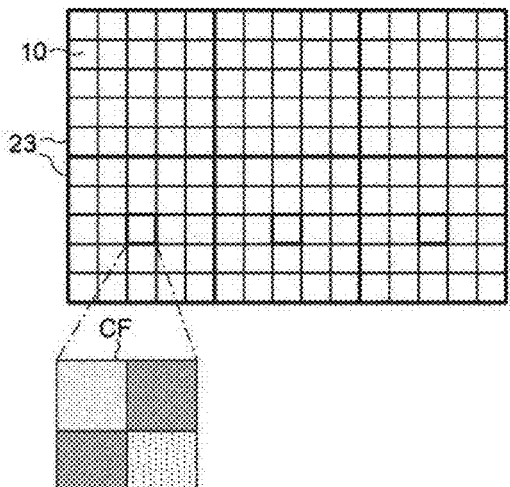
FIG. 12A is a plan view illustrating a third example of a color filter having 2×2 subpixels.
Figure 12B:
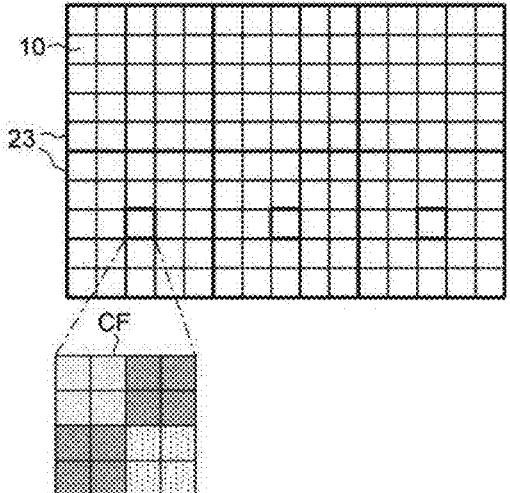
FIG. 12B is a plan view illustrating a third example of a color filter having 4×4 subpixels.
Figure 12C:
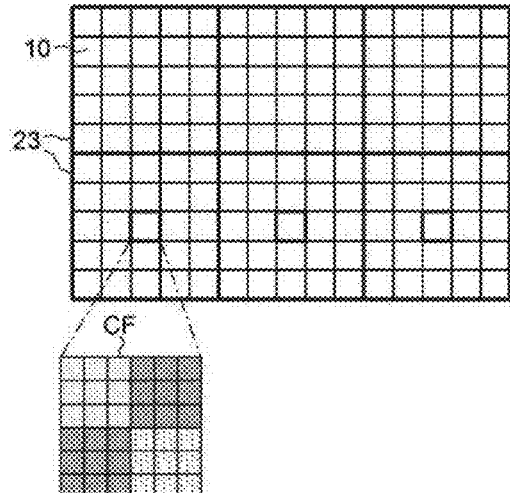
FIG. 12C is a plan view illustrating a third example of a color filter having 6×6 subpixels.

In FIGS. 4 to 11 described above, although the 3×3 macro pixel 23 has been described, the size of the macro pixel 23 is arbitrary. FIGS. 12A, 12B, and 12C are plan views illustrating a third example of a color filter CF, all the color filters CF illustrated in FIGS. 12A to 12C are a Bayer array and are divided into four color filter units for each pixel 10. Among them, two color filter units are green color filter units, and the remaining color filter units are red and blue color filter units. Each of the color filters CF illustrated in FIGS. 12A to 12C has four color filter units for each pixel 10 of the inside of a macro pixel 23. FIG. 12A illustrates an example in which each pixel 10 is divided into 2×2 subpixels, FIG. 12B illustrates an example in which each pixel 10 is divided into 4×4 subpixels, and FIG. 12C illustrates an example in which each pixel 10 is divided into 6×6 subpixels.

Figure 13:
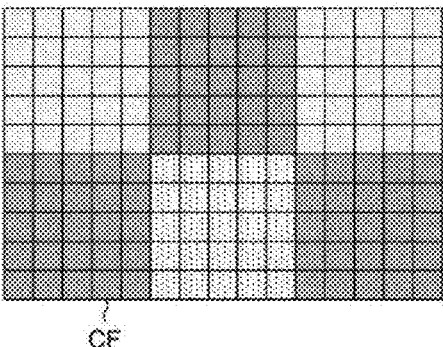
FIG. 13 is a plan view illustrating a fourth example of a color filter.

FIG. 13 is a plan view illustrating a fourth example of a color filter CF. The color filter CF illustrated in FIG. 13 corresponds to a 5×5 macro pixels 23. Each macro pixel 23 has a color filter unit of a specific color, and each color filter unit is a Bayer array.

Figure 14:
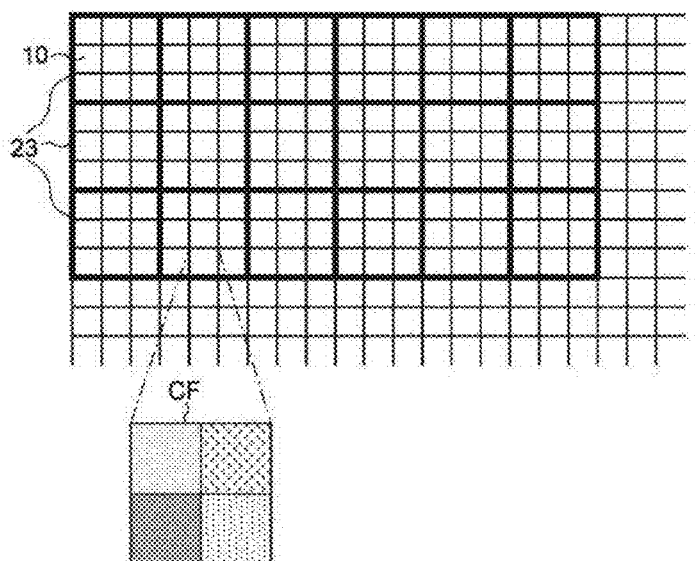
FIG. 14 is a plan view illustrating a fifth example of a color filter.

Although the color filters CF according to the first to fourth examples described above have color filter units of three colors of RGB, a color filter unit that transmits light of a color wavelength other than RGB may be disposed. FIG. 14 is a plan view illustrating a fifth example of a color filter CF. An example in which the color filter CF illustrated in FIG. 14 has four color filter units for each pixel 10 of the inside of the macro pixel 23, and these four color filter units have a color filter unit of yellow in addition to filter units of three colors of RGB.

A color other than RGB is not limited to yellow. In addition, the color filter CF may have color filter units of an IR optical wavelength band other than a visible light wavelength band, a polarization filter, a complementary color filter, or the like.

In a case in which color filter units of different types are disposed in the color filter CF, a product-sum operation may be performed by providing different color coefficients together with disposing a photoelectric conversion unit inside a pixel 10 in association with each color filter unit.

In FIGS. 4 to 13, an example in which a pixel block at the time of performing a convolution operation has each of 3×3 macro pixels 23 that are disposed to be adjacent to each other has been described. The macro pixels 23 do not necessarily need to be disposed to be adjacent to each other, and a pixel block may be composed of macro pixels 23 that are disposed at positions separate from each other.

Figure 15:
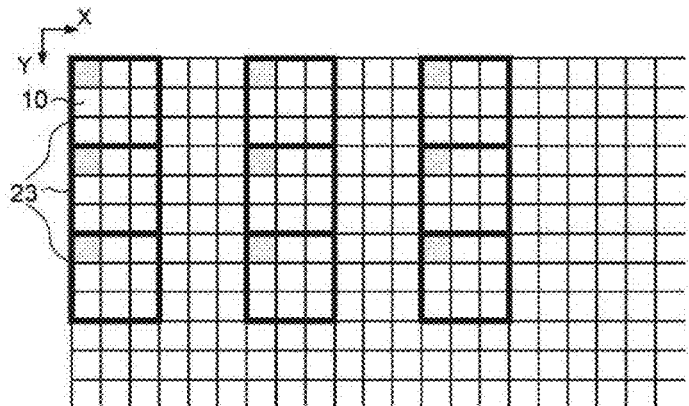
FIG. 15 is a diagram illustrating a first example of arrangement of macro pixels inside a pixel block.

FIG. 15 is a diagram illustrating a first example of arrangement of macro pixels 23 of the inside of a pixel block. The macro pixels 23 illustrated in FIG. 15 are disposed to be separate from each other with a space of three pixels 10 in the first direction X and are disposed to be adjacent to each other in the second direction Y.

Figure 16:
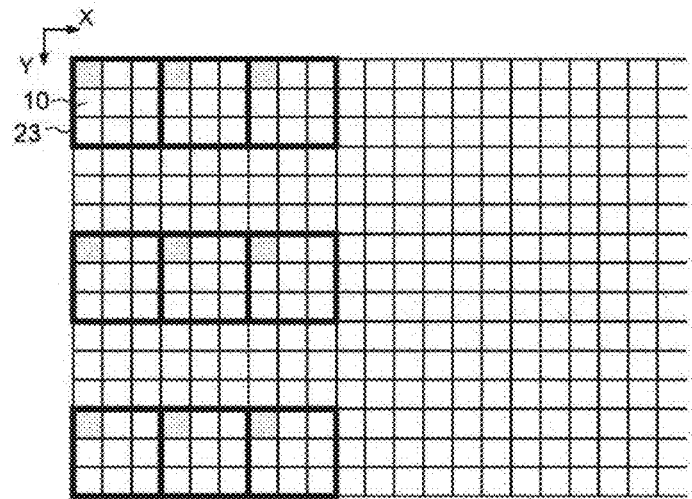
FIG. 16 is a diagram illustrating a second example of arrangement of macro pixels inside a pixel block.

FIG. 16 is a diagram illustrating a second example of arrangement of macro pixels 23 of the inside of a pixel block. The macro pixels 23 of the inside of the pixel block illustrated in FIG. 16 are disposed to be adjacent to each other in the first direction X and are disposed to be separate with a space of three pixels 10 from each other in the second direction Y.

Figure 17:
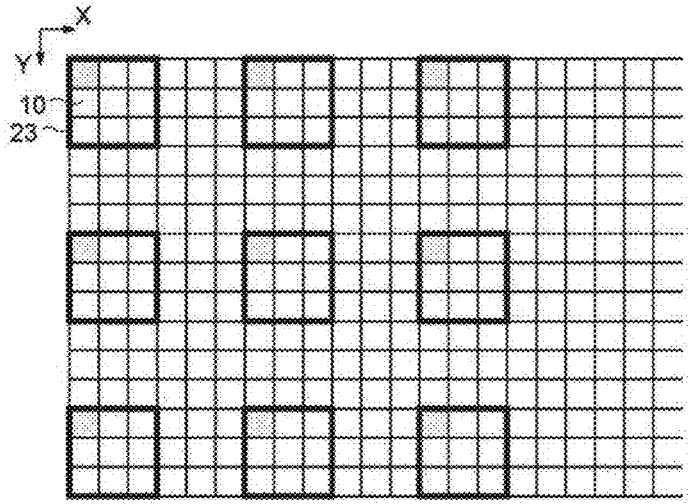
FIG. 17 is a diagram illustrating a third example of arrangement of macro pixels inside a pixel block.

FIG. 17 is a diagram illustrating a third example of arrangement of macro pixels 23 of the inside of a pixel block. The macro pixels 23 of the inside of the pixel block illustrated in FIG. 17 are disposed to be separate with a space of three pixels 10 from each other in any one of the first direction X and the second direction Y.

Figure 18:
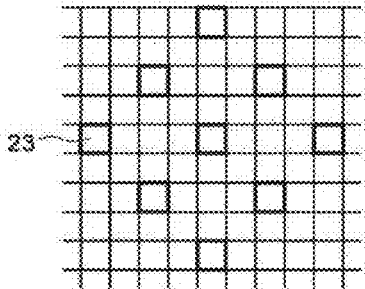
FIG. 18 is a diagram illustrating a fourth example of arrangement of macro pixels inside a pixel block.

FIG. 18 is a diagram illustrating a fourth example of arrangement of macro pixels 23 of the inside of a pixel block. The macro pixels 23 configuring the pixel block illustrated in FIG. 18 are disposed to be separate by one pixel 10 in a diagonal direction.

A pixel block is not limited to the size of the 3×3 macro pixel 23 and may take an arbitrary size. In fifth to eighth examples of the pixel block to be described below have macro pixels 23 more than the 3×3 macro pixels 23.

Figure 19:
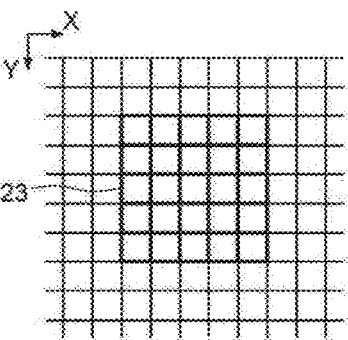
FIG. 19 is a diagram illustrating a fifth example of arrangement of macro pixels inside a pixel block.

FIG. 19 is a diagram illustrating a fifth example of arrangement of macro pixels 23 of the inside of a pixel block. The pixel block illustrated in FIG. 19 has 5×5 macro pixels 23, and the macro pixels 23 are disposed to be adjacent to each other in the first direction X and the second direction Y.

Figure 20:
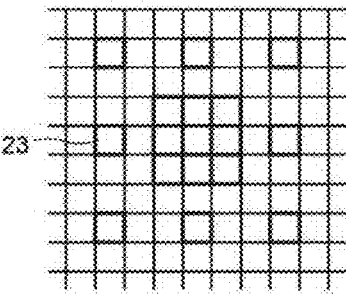
FIG. 20 is a diagram illustrating a sixth example of arrangement of macro pixels inside a pixel block.

FIG. 20 is a diagram illustrating a sixth example of arrangement of macro pixels 23 of the inside of a pixel block. The pixel block illustrated in FIG. 20 has 3×3 macro pixels 23 disposed to be adjacent to each other and eight macro pixels 23 equally disposed to be separate in the vicinity thereof.

Figure 21:
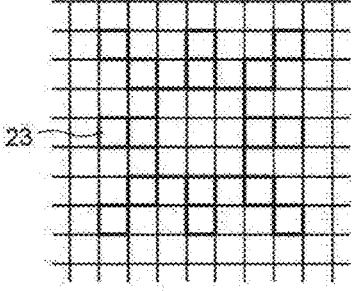
FIG. 21 is a diagram illustrating a seventh example of arrangement of macro pixels inside a pixel block.

FIG. 21 is a diagram illustrating a seventh example of arrangement of macro pixels 23 of the inside of a pixel block. The pixel block illustrated in FIG. 21 has 3×3 macro pixels 23 disposed to be adjacent to each other and 16 macro pixels 23 disposed in the vicinity thereof.

Figure 22:
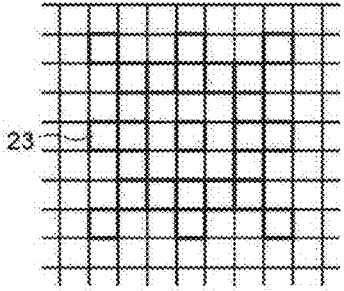
FIG. 22 is a diagram illustrating an eighth example of arrangement of macro pixels inside a pixel block.

FIG. 22 is a diagram illustrating an eighth example of arrangement of macro pixels 23 of the inside of a pixel block. The pixel block illustrated in FIG. 22 has one macro pixel 23 disposed at the center, 16 macro pixels 23 disposed to surround the vicinity thereof with being separate by one pixel 10, and eight macro pixels 23 disposed to be adjacent to the vicinity thereof.

As described above, the size of a pixel block is arbitrary, and a shift amount of a pixel block at the time of performing a convolution operation is arbitrary as well.

In accordance with a size and a shift amount of a pixel block, the number of pixels 10 for which pixel signals are read from macro pixels 23 changes.

Figure 23A:
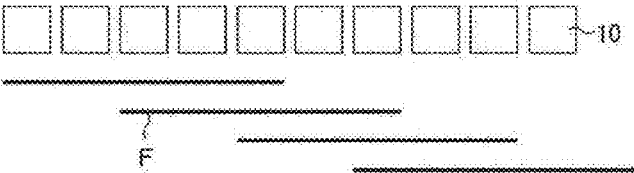
FIG. 23A is a diagram illustrating a relation between a size of a pixel block and a shift amount.

FIG. 23A is a diagram illustrating a relation between a size and a shift amount of a pixel block. FIG. 23A illustrates an example in which a product-sum operation with corresponding filter coefficients is performed by selecting one pixel 10 from five macro pixels 23 of the inside of a 5×5 pixel block at each time, and thereafter, a similar product-sum operation is performed by performing shifting of two macro pixels. A thin solid line in FIG. 23A represents a size of one pixel block, and a thick solid line represents a size of a filter F. In the case of FIG. 23A, by using the macro pixel 23, there are a case in which pixel signals of three pixels 10 are read and a case in which pixel signals of two pixels 10 are read.

Figure 23B:
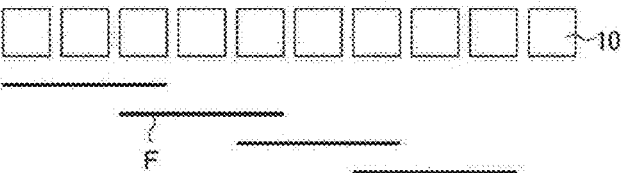
FIG. 23B is a diagram of one modified example of FIG. 23A.

FIG. 23B is a diagram illustrating one modified example of FIG. 23A. FIG. 23B illustrates an example in which a product-sum operation with corresponding filter coefficients is performed by selecting one pixel 10 from three macro pixels 23 of the inside of a 3×3 pixel block at each time, and thereafter, a similar product-sum operation is performed by performing shifting of two macro pixels. A thin solid line in FIG. 23B represents a size of one pixel block, and a thick solid line represents a size of a filter F. In the case of FIG. 23B, by using the macro pixel 23, there are a case in which pixel signals of two pixels 10 are read and a case in which a pixel signal of one pixel 10 is read.

As can be understood from FIGS. 23A and 23B, in accordance with the size of the pixel block and a shift amount of the filter F, the number of pixel signals read in parallel is different for each pixel 10.

(First Circuit Example of Pixel 10)

Figure 24:
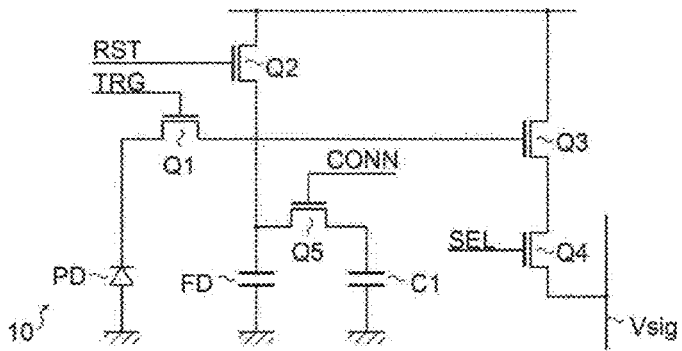
FIG. 24 is a circuit diagram illustrating a first circuit example of a pixel inside a pixel array unit.

FIG. 24 is a circuit diagram illustrating a first circuit example of a pixel 10 of the inside of the pixel array unit 11. The circuit illustrated in FIG. 24 enables multiplication with filter coefficients inside the pixel 10.

The pixel 10 illustrated in FIG. 24 includes a photoelectric conversion unit PD, a transfer transistor Q1, a floating diffusion region FD, an additional capacitor C1, a reset transistor Q2, an amplification transistor Q3, a selection transistor Q4, and a connection transistor Q5.

The photoelectric conversion unit PD, for example, is configured using a photodiode, receives light that has been incident, performs photoelectric conversion, and accumulates electric charge acquired as a result thereof. In addition, when a drive signal TRG supplied to a gate of the transfer transistor Q1 becomes a high level, and the transfer transistor Q1 becomes on, electric charge accumulated in the photoelectric conversion unit PD is transmitted to the floating diffusion region FD through the transfer transistor Q1.

The floating diffusion region FD temporarily stores electric charge transmitted from the transfer transistor Q1. The additional capacitor C1 is connected to the floating diffusion region FD through the connection transistor Q5, and, when a drive signal CONN supplied to a gate of the connection transistor Q5 becomes a high level, and the connection transistor Q5 becomes on, the floating diffusion region FD and the additional capacitor C1 are electrically connected to each other. In this case, the electric charge transmitted through the transfer transistor Q1 is stored in the floating diffusion region FD and the additional capacitor C1.

In addition, a vertical signal line Vsig is connected to the floating diffusion region FD through the amplification transistor Q3 and the selection transistor Q4. The vertical signal line Vsig is connected to a comparator of the same column of the AD conversion unit 13 (FIG. 1).

When the reset transistor Q2 becomes on in accordance with a reset signal RST, the electric charge stored in the floating diffusion region FD is discharged to a constant voltage source VDD, whereby the electric potential of the floating diffusion region FD is reset. At a timing at which the reset transistor Q2 becomes on, the connection transistor Q5 becomes on as well, and the electric potential of the additional capacitor C1 is also reset at the same time.

The amplification transistor Q3 outputs a pixel signal according to the electric potential of the floating diffusion region FD. In other words, the amplification transistor Q3 configures a source follower circuit together with a load MOS (not illustrated) as a constant current source, and a pixel signal representing a level corresponding to electric charge stored in the floating diffusion region FD is output from the amplification transistor Q3 to the AD conversion unit 13 (FIG. 1) through the selection transistor Q4. The load MOS, for example, is disposed inside the AD conversion unit 13.

The selection transistor Q4 becomes on when the pixel 10 is selected in accordance with a selection signal SEL, and the pixel signal of the pixel 10 is output to the AD conversion unit 13 through the vertical signal line Vsig.

In the pixel 10 configured as described above, by controlling on/off of the connection transistor Q5 and controlling connection between the floating diffusion region FD and the additional capacitor C1, the conversion efficiency at the time of converting accumulated electric charge (electric potential) of the floating diffusion region FD into a voltage signal can be changed. In accordance with this, a weight of the pixel signal can be differently set.

In other words, when, in a state in which the floating diffusion region FD and the additional capacitor C1 are electrically connected to each other, electric charge from the photoelectric conversion unit PD is accumulated in the floating diffusion region FD and the additional capacitor C1, and a signal according to the electric charge is read, the conversion efficiency for a voltage signal is lowered.

To the contrary, when, in a state in which the floating diffusion region FD is electrically disconnected from the additional capacitor C1, electric charge from the photoelectric conversion unit PD is accumulated in the floating diffusion region FD, and a signal corresponding to the electric charge is read, the conversion efficiency for a voltage signal becomes higher.

For example, electric charge is converted into a voltage signal by connecting the floating diffusion region FD and the additional capacitor C1 in a certain pixel 10 of the pixel array unit 11, and electric charge is converted into a voltage signal without connecting the floating diffusion region FD and the additional capacitor C1 in another pixel 10, whereby a weight of the pixel signal can be changed in units of pixels 10. The weight of the pixel signal can be set to a capacitance ratio between the floating diffusion region FD and the additional capacitor C1.

The imaging device 1, for example, has a normal mode and an addition mode as operating modes, and, in the normal mode, the floating diffusion region FD and the additional capacitor C1 are not connected, and imaging is performed by setting weights of the pixels 10 to be the same. On the other hand, in the addition mode, the imaging device 1 connects the floating diffusion region FD and the additional capacitor C1 to each other in a predetermined pixel 10, and imaging is performed by differently setting the weights of the pixels 10.

In addition, although the circuit of the pixel 10 illustrated in FIG. 24 is a pixel circuit of a rolling shutter system by further disposing an electric charging storing unit (a memory unit) storing electric charge transmitted by the transfer transistor Q1 and a second transfer transistor Q1 that transmits the electric charge of the electric charge storing unit to the floating diffusion region FD between the transfer transistor Q1 and the floating diffusion region FD, driving of a global shutter system may be able to be performed.

In this way, in the pixel 10 illustrated in FIG. 24, by connecting the additional capacitor C1 to the floating diffusion region FD, the weight of the pixel signal can be adjusted, and this is equivalent to multiplication with filter coefficients inside the pixel 10.

In addition, in FIG. 24, although conversion efficiency at the time of electric charge-voltage conversion is configured to be able to be changed, the conversion efficiency at the time of electric charge-voltage conversion may be configured to be fixed. In this case, the connection transistor Q5 may be omitted, and the floating diffusion region FD and the additional capacitor C1 may be connected in parallel.

Figure 25:
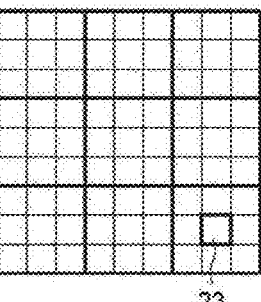
FIG. 25 is a diagram illustrating a pixel configured by the circuit illustrated in FIG. 24.

The circuit of the pixel 10 illustrated in FIG. 24, as illustrated in FIG. 25, illustrates the circuit configuration of one pixel 10 inside of each macro pixel 23 of the inside of the pixel block.

In a case in which pixel signals of a plurality of pixels 10 are not read from each macro pixel 23 of the inside of the pixel block illustrated in FIG. 25, reading circuits of two or more pixels 10 of the inside of the macro pixel 23 may be shared.

Figure 26:
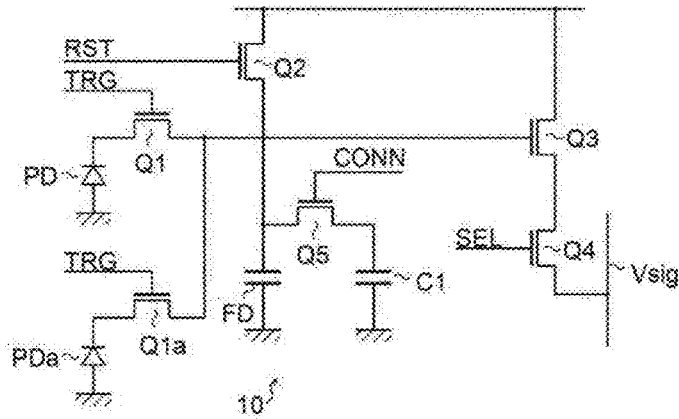
FIG. 26 is a circuit diagram illustrating an example in which reading circuits of two pixels are shared.

FIG. 26 is a circuit diagram illustrating an example in which reading circuits of two pixels 10 are shared. FIG. 26, in addition to the circuit configuration of FIG. 24, has a photoelectric conversion unit pDa and a transfer transistor Q1a of another pixel 10. Both drains of the two transfer transistors Q1 and Q1a are connected to a gate of the amplification transistor Q3.

(Second Circuit Example of Pixel 10)

Figure 27:
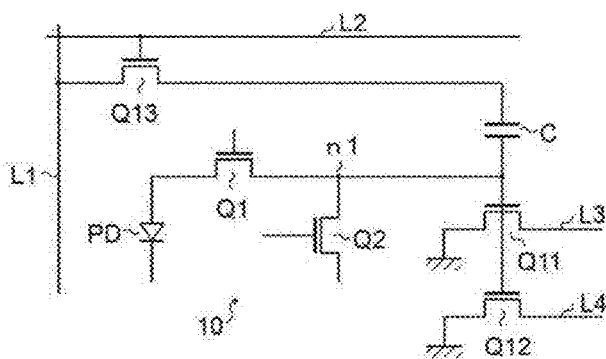
FIG. 27 is a circuit diagram illustrating a second circuit example of a pixel inside a pixel array unit.

FIG. 27 is a circuit diagram illustrating a second circuit example of a pixel 10 of the inside of the pixel array unit 11. The pixel 10 illustrated in FIG. 27 has a photoelectric conversion unit PD formed from a photodiode, transistors Q1, Q2, Q11, Q12, and Q13, and a capacitor C.

The transistor Q1 transmits electric charge acquired through photoelectric conversion performed by the photoelectric conversion unit PD to a node n1. The transistor Q2 can initialize the electric potential of the node n1. The transistors Q11 and Q12 are connected to one end of the capacitor C. The transistor Q13 supplies an electric potential corresponding to a weight coefficient to the other end of the capacitor C. A drain of the transistor Q13 is connected to a wiring L1, and a gate is connected to a wiring L2. When a control signal on the wiring L2 is at the high level, the transistor Q13 supplies an electric potential corresponding to a weight coefficient on the wiring L1 to the other end of the capacitor C.

A wiring L3 connected to the drain of the transistor Q11 is a vertical signal line, and a wiring L4 connected to the drain of the transistor Q12 is connected to an adjacent pixel that does not have a color filter of the same color.

In this way, the circuit of the pixel 10 illustrated in FIG. 27 can perform a process of multiplying a pixel signal corresponding to electric charge acquired through photoelectric conversion performed by the photoelectric conversion unit PD by filter coefficients (weight coefficients) using the transistors Q11 to Q13 and the capacitor C.

This embodiment has a feature in which pixel signals from a plurality of pixels 10 that are not adjacent to each other or signals acquired by multiplying pixel signals by filter coefficients are output in parallel. In a case in which a product-sum operation is performed outside the pixel 10, pixel signals may be output in parallel from a plurality of pixels 10 that are not adjacent to each other. In addition, in a case in which multiplication with filter coefficients is performed inside the pixel 10, multiplication results may be output in parallel from a plurality of pixels 10 that are not adjacent to each other.

Although FIGS. 24 and 27 illustrate circuit configurations that are able to perform a multiplication process of a pixel signal and filter coefficients inside the pixel 10, in a case in which a product-sum operation for a convolution operation is performed outside the pixel 10, the circuit of the pixel 10 may be the same as the circuit of the pixel 10 of a general imaging device.

Figure 28A:
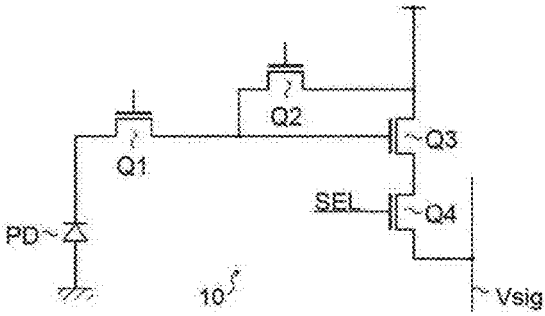
FIG. 28A is a circuit diagram illustrating a first example of a pixel performing a product-sum operation outside the pixel.

FIG. 28A is a circuit diagram illustrating a first example of a pixel 10 performing a product-sum operation outside the pixel 10. Similar to a general pixel 10, the pixel 10 illustrated in FIG. 28A has a photoelectric conversion unit PD formed from a photodiode, a transfer transistor Q1, a reset transistor Q2, an amplification transistor Q3, and a selection transistor Q4.

Although the pixel 10 illustrated in FIG. 28A performs imaging using the rolling shutter system, a circuit configuration that performs imaging using the global shutter system may be employed.

Figure 28B:
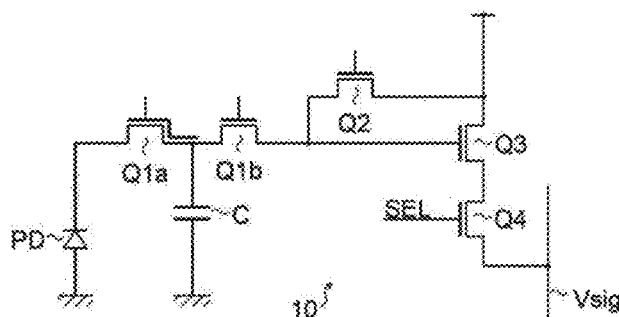
FIG. 28B is a circuit diagram illustrating a second example of a pixel performing a product-sum operation outside the pixel.

FIG. 28B is a circuit diagram illustrating a second example of a pixel 10 that performs a product-sum operation outside the pixel 10. The pixel 10 illustrated in FIG. 28B has transfer transistors Q1a and Q1b in place of the transfer transistor Q1 illustrated in FIG. 28A and a capacitor C storing electric charge acquired through photoelectric conversion. Since electric charge acquired through photoelectric conversion in each pixel 10 is stored in the capacitor C, pixel signals of all the pixels 10 can be read in parallel, and imaging using the global shutter system can be performed.

Figure 29:
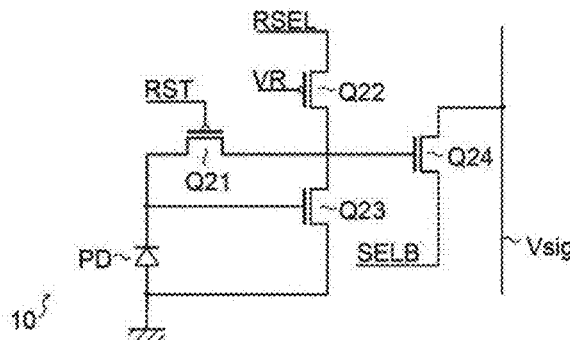
FIG. 29 is a circuit diagram performing AD conversion inside a pixel.

The pixel 10 may include a circuit that performs AD conversion inside the pixel 10. FIG. 29 is a circuit diagram in which AD conversion is performed inside the pixel 10. The pixel 10 illustrated in FIG. 29 has a photoelectric conversion unit PD formed from a photodiode and transistors Q21 to Q24. The transistors Q21 and Q22 are PMOS transistors, and the transistors Q23 and Q24 are NMOS transistors.

A ramp wave signal VR of which electric potential level changes continuously or in a stepped manner is input to a gate of the transistor Q22. An output node of the photoelectric conversion unit PD and a source of the transistor Q21 are connected to a gate of the transistor Q23. A drain of the transistor Q21 is connected to a gate of the transistor Q24, a drain of the transistor Q22, and a drain of the transistor Q23. The transistors Q22 and Q23 are cascade connected between an input node of a selection signal and a ground node.

In a state in which the photoelectric conversion unit PD does not perform photoelectric conversion, the transistor Q23 is on, and a gate of the transistor Q24 is at the low level, whereby the transistor Q24 is off. In this state, the electric potential of the signal line Vsig is at the high level.

When the photoelectric conversion unit PD performs photoelectric conversion, the electric potential of the gate of the transistor Q23 falls in accordance with electric charge generated through the photoelectric conversion, and the gate electric potential of the transistor Q24 rises. A ramp wave signal is a signal of which an electric potential level falls continuously or in a stepped manner. Thus, at a certain time point, the transistor Q22 becomes on, the gate voltage of the transistor Q24 becomes the high level, the transistor Q24 becomes on, and the electric potential of the signal line Vsig falls. In this way, the signal line Vsig transmits a digital signal of a pulse width according to electric charge output from the photoelectric conversion unit PD.

The photoelectric conversion unit PD of the inside of the pixel 10 does not necessarily need to be formed using silicon and may be configured using an organic or inorganic photoelectric conversion film.

Figure 30:
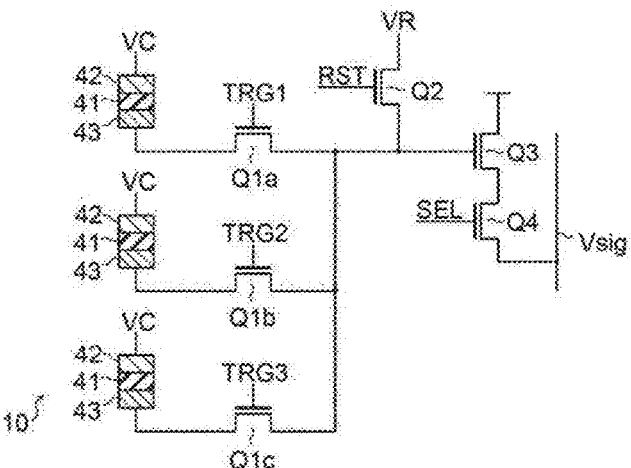
FIG. 30 is a circuit diagram of a pixel having an organic or inorganic photoelectric conversion film.

FIG. 30 is a circuit diagram of a pixel 10 having an organic or inorganic photoelectric conversion film. A photoelectric conversion film 41 illustrated in FIG. 30 has a structure in which it is interposed between a transparent electrode 42 and a lower electrode 43. FIG. 30 illustrates an example in which three photoelectric conversion films 41 corresponding to three pixels 10 and three transfer transistors Q1a, Q1b, and Q1c are included. These three pixels 10 share a reset transistor Q2, an amplification transistor Q3, and a selection transistor Q4.

By individually controlling three transfer transistors Q1a, Q1b, and Q1c, pixel signals of three pixels 10 can be sequentially supplied to a signal line Vsig through the amplification transistor Q3 and the selection transistor Q4 and can compose two or more pixel signals and supply a resultant signal to the signal line Vsig.

At least some of pixels 10 of the inside of the pixel array unit 11 may be pixels 10 that are able to acquire event information. Such pixels 10, for example, may be referred to as Event base Vision Sensor (EVS) or Dynamic Vision Sensor (DVS) pixels 10. Hereinafter, they will be referred to as EVS pixels.

Figure 31:
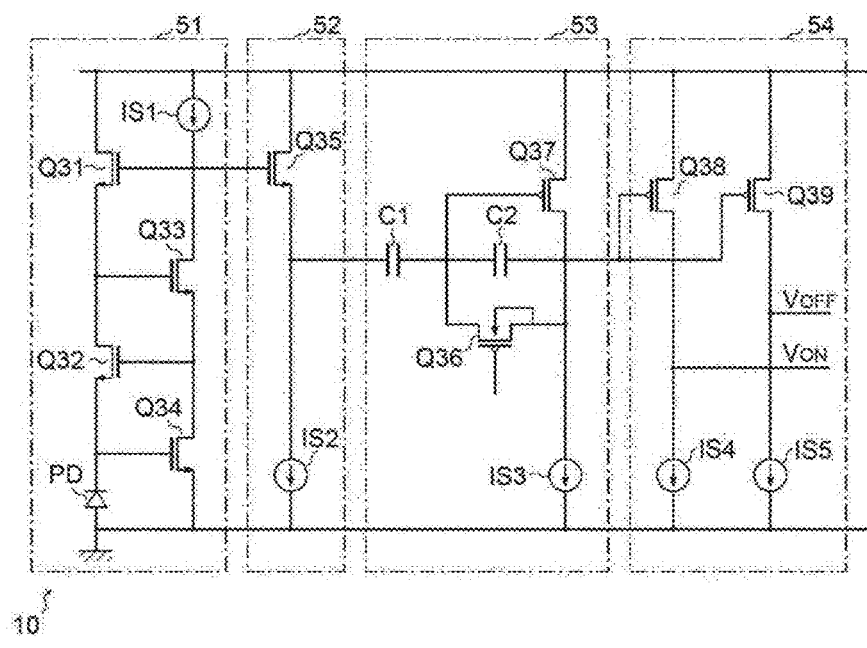
FIG. 31 is a circuit diagram illustrating an example of a circuit configuration of an EVS pixel.

FIG. 31 is a circuit diagram illustrating an example of the circuit configuration of the EVS pixel 10. The EVS pixel 10 illustrated in FIG. 31 includes a current-voltage conversion unit 51, a source follower circuit 52, a differential circuit 53, and a comparator 54.

The current-voltage conversion unit 51 has transistors Q31 and Q32 that are cascade connected between a power source voltage node and an output node of the photoelectric conversion unit PD, a current source IS1, and transistors Q33 and Q34 that are cascade connected between an output node and a ground node of the current source IS1. An output node of the current source IS1 is connected to a gate of the transistor Q31. A gate of the transistor Q32 is connected to a connection node of a source of the transistor Q33 and a drain of the transistor Q34. A gate of the transistor Q33 is connected between a source of the transistor Q31 and a drain of the transistor Q32.

The current-voltage conversion unit 51 converts electric charge acquired through photoelectric conversion performed by the photoelectric conversion unit PD into a voltage signal of a logarithmic value and outputs the voltage signal.

The source follower circuit 52 has a transistor Q35 and a current source IS2. A gate of the transistor Q35 is connected to an output node of the current-voltage conversion unit 51, a drain of the transistor Q35 is connected to the power source voltage node, and a source of the transistor Q35 is connected to the current source IS2. The transistor Q35 is connected as a source follower, and a source voltage of the transistor Q35 changes in accordance with the output voltage of the current-voltage conversion unit 51.

The differential circuit 53 detects an amount of change in the optical amount. The differential circuit 53 has capacitors C1 and C2, transistors Q36 and Q37 that are PMOS transistors, and a current source IS3. The capacitors C1 and C2 are connected to an input/output node of the differential circuit 53 in series. A source of the transistor Q36 is connected to an output node of the differential circuit 53, and a drain of the transistor Q36 is connected to a connection node of the capacitors C1 and C2, and a gate of the transistor Q37. A source of the transistor Q37 is connected to the power source voltage node, and a drain of the transistor Q37 is connected to the current source IS3. A differential signal is output from a drain of the transistor Q37. The differential circuit 53 supplies a differential signal Vout representing an amount of change in the optical amount to the comparator 54.

The comparator 54 has transistors Q38 and Q39 and current sources IS4 and IS5. The current source IS4 is used for setting an upper threshold value, and the current source IS5 is used for setting a lower threshold value. The transistor Q38 is on when the electric potential level of the differential signal Vout is higher than the upper threshold value, and the transistor Q39 is on when the electric potential level of the differential signal Vout is lower than the lower threshold value.

A product-sum operation for a convolution operation can be performed after a pixel signal is converted into a digital pixel signal by the AD conversion unit 13 illustrated in FIG. 1.

Figure 32:
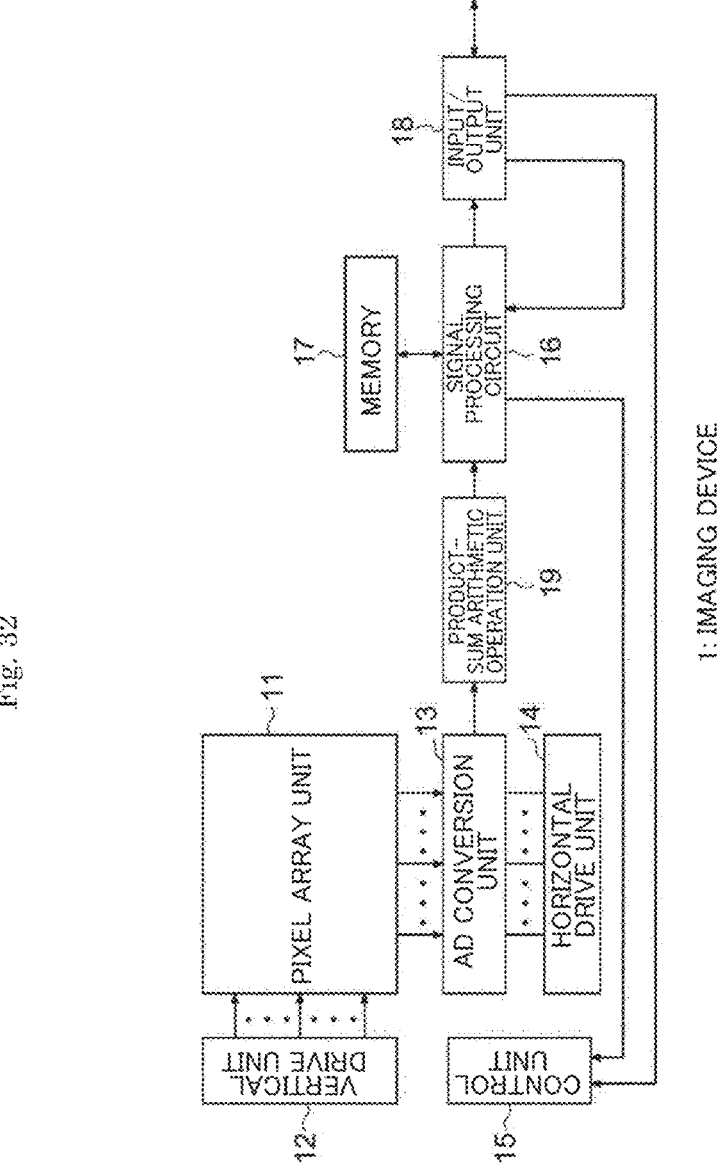
FIG. 32 is a block diagram of an imaging device that has a product-sum arithmetic operation unit.

In this case, as illustrated in FIG. 32, by disposing a product-sum arithmetic operation unit 19 between the AD conversion unit 13 and the signal processing circuit 16, a result acquired through a product-sum operation performed by the product-sum arithmetic operation unit 19 may be supplied to the signal processing circuit 16.

In addition, when AD conversion is performed using the AD conversion unit 13, after a product sum operation is performed by weighting pixel signals, AD conversion may be performed by comparing a result thereof with a reference signal.

Figure 33:
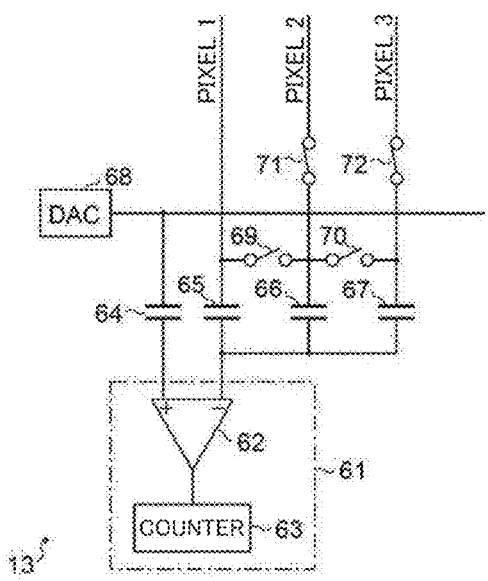
FIG. 33 is a circuit diagram illustrating an example of an internal configuration of an AD conversion unit.

FIG. 33 is a circuit diagram illustrating an example of the internal configuration of the AD conversion unit 13. The AD conversion unit 13 has a column ADC 61 in units of pixel columns of the pixel array unit 11. The column ADC 61 illustrated in FIG. 10 is a column ADC 61 corresponding a pixel 10 of a predetermined v-th column among pixels 10 aligned in a column direction in the pixel array unit 11. FIG. 33 illustrates the internal configuration of the column ADC 61. The column ADC 61 has a comparator 62 and a counter (U/D CNT) 63. Four capacitors 64 to 67 are connected to the column ADC 61, and switches 69 to 72 are connected to the capacitors 65 to 67.

The comparator 62 outputs a differential signal acquired by comparing a pixel signal with a reference signal supplied from a Digital to Analog Converter (DAC) 68 to the counter 63. For example, in a case in which the reference signal is larger than the pixel signal, a differential signal of a high level is supplied to the counter 63, and, in a case in which the reference signal is smaller than the pixel signal, a differential signal of a low level is supplied to the counter 63.

The counter 63 performs down counting only while a differential signal of Hi is supplied in a P phase (reset phase) AD enable period and performs up-counting only while a differential signal of Hi is supplied in a D phase (data phase) AD enable period. The P phase AD enable period is a period in which a reset component ΔV that is a deviation component of the pixel 10 is measured, the D phase AD enable period is a period in which (signal component Vsig+reset component ΔV) is measured, and when a count in the P phase AD enable period and a count in the D phase AD enable period match each other, only a signal component Vsig can be acquired using (signal component Vsig+reset component ΔV)−(reset component ΔV), whereby a CDS process is realized.

The capacitors 64 to 67 are used for eliminating DC components of a reference signal and a pixel signal, the capacitance of the capacitor 65 is ⅗ of the capacitance of the capacitor 64, and the capacitance of each of the capacitors 66 and 67 is ⅕ of the capacitance of the capacitor 64. Thus, combined capacitance acquired by combining the capacitance of the capacitors 65 to 67 is equivalent to the capacitance of the capacitor 64.

One end of the capacitor 64 is connected to a DAC 68, and the other end is connected to the comparator 62. One end of the capacitor 65 is connected to the comparator 62, and the other end is connected the pixel 10 through a vertical signal line Vsig.

In addition, one end of the capacitor 66 is connected to the comparator 62, and the other end is connected to a vertical signal line Vsig (not illustrated) of a pixel 10 (v−1) adjacent to a row direction of the pixel 10 through a switch 71 and a connection wiring. One end of the capacitor 67 is connected to the comparator 62, and the other end is connected to a vertical signal line Vsig (not illustrated) of a pixel 10 (v+1), which is on a side opposite to the pixel 10 (v−1), adjacent to the pixel 10 through a switch 72 and a connection wiring.

In addition, electrodes of the capacitors 65 and 66 on a side opposite to the comparator 62 side are connected through a switch 69, and electrodes of the capacitors 66 and 67 on a side opposite to the comparator 62 side are connected through a switch 70.

In a normal mode, in accordance with the control unit 15, both the switches 69 and 70 are on, and both the switches 71 and 72 are off. In this case, the comparator 62 compares a reference signal supplied from the DAC 68 with a pixel signal of the pixel 10 and outputs a differential signal acquired as a result thereof. In other words, in the normal mode, an analog pixel signal is converted from analog to digital at a ratio equal to a pixel column unit.

On the other hand, in a pixel addition mode, in accordance with the control unit 15, both the switches 69 and 70 are off, and both the switches 71 and 72 are on. In this case, the comparator 62 compares a reference signal supplied from the DAC 68 with an added pixel signal acquired by adding three pixel signals including pixels 10 (v−1), 100v, and 100 (v+1) and supplies a differential signal acquired as a result thereof to the counter 63.

Since the capacitance ratio of the capacitors 65 to 67 is 3:1:1, the column ADC 61 outputs a pixel signal acquired by adding pixel signals of three pixels 10 (v−1), 100v, and 100 (v+1) that are adjacent in a row direction at the ratio of 1:3:1.

As above, by disposing a plurality of capacitors for pixel signals originally prepared for eliminating DC components under a condition that the combined capacitance is the same as the capacitance of the capacitor used for eliminating a DC component of a reference signal, a process of adding pixel signals of a plurality of pixels 10 adjacent to each other in the row direction at a predetermined ratio can be realized.

(Process Operation of Imaging Device)

Figure 34:
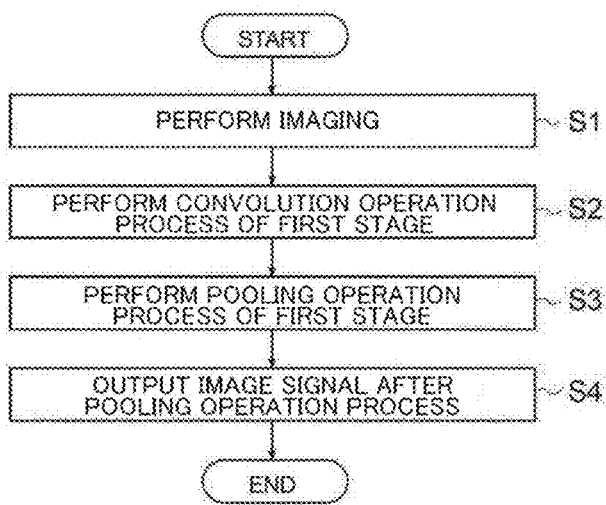
FIG. 34 is a flowchart illustrating a process operation of an imaging device 1 according to this embodiment.

FIG. 34 is a flowchart illustrating a process operation of the imaging device 1 according to this embodiment. The process illustrated in FIG. 34 starts, for example, when a control signal instructing imaging is input from an external image processing device.

In Step S1, the imaging device 1 performs imaging. In other words, the control unit 15 supplies a clock signal and a control signal to the vertical drive unit 12 and the horizontal drive unit 14 and causes each pixel 10 of the pixel array unit 11 to perform light reception according to a predetermined exposure period. A pixel signal after light reception is input to the AD conversion unit 13, is converted into a digital signal by the AD conversion unit 13, and then is supplied to the signal processing circuit 16.

In Step S2, the signal processing circuit 16 performs a convolution operation process of a first stage of the CNN for a captured image acquired by the pixel array unit 11. In accordance with this, in the signal processing circuit 16, a pixel signal of each pixel 10 of the pixel array unit 11 is multiplied by filter coefficients read from the memory 17. In Step S2, as described above, one pixel 10 that has not been selected and is not adjacently disposed is selected from each macro pixel 23 of the inside of the pixel block, and a product sum operation of a read pixel signal and corresponding filter coefficients is performed.

In Step S3, the signal processing circuit 16 performs a pooling operation process of a first stage of the CNN for a captured image after the convolution operation process. In accordance with this, in the signal processing circuit 16, a pixel signal after being multiplied by filter coefficients is substituted into a pooling function, whereby a predetermined arithmetic operation is performed.

In Step S4, the signal processing circuit 16 outputs an image signal of a captured image after the pooling operation process to an external image processing device through the input/output unit 18 and ends the imaging process.

In this way, in the imaging device according to this embodiment, when a convolution operation is performed for a pixel signal captured by each pixel 10 of the inside of the pixel array unit 11, a product-sum operation is performed with a filter F for each pixel block having a plurality of macro pixels 23 including a plurality of pixels 10. At this time, one pixel 10 that is not adjacently disposed is selected from each macro pixel 23 of the inside of the pixel block at each time, and a product-sum operation with corresponding filter coefficients is performed. Thereafter, the filter F is shifted in the first direction X or the second direction Y by one macro pixel, and a similar product-sum operation is repeated.

By configuring a pixel 10 selected from each macro pixel 23 to be different from the pixel 10 that has been previously selected when the filter F is shifted, the same pixel 10 is not selected over a plurality of times, and thus a memory storing a pixel signal is not required inside the pixel 10, and a plurality of amplification transistors do not need to be disposed inside the pixel 10. Thus, there is no concern that the pixel 10 size may become large.

In addition, since the same pixel 10 is not selected over a plurality of number of times, filter coefficients can be made different every time a product-sum operation is performed for a new pixel block, and thus a degree of freedom of a convolution operation can be improved.

[Specific Circuit Configuration of Pixel Block]

Figure 35A:
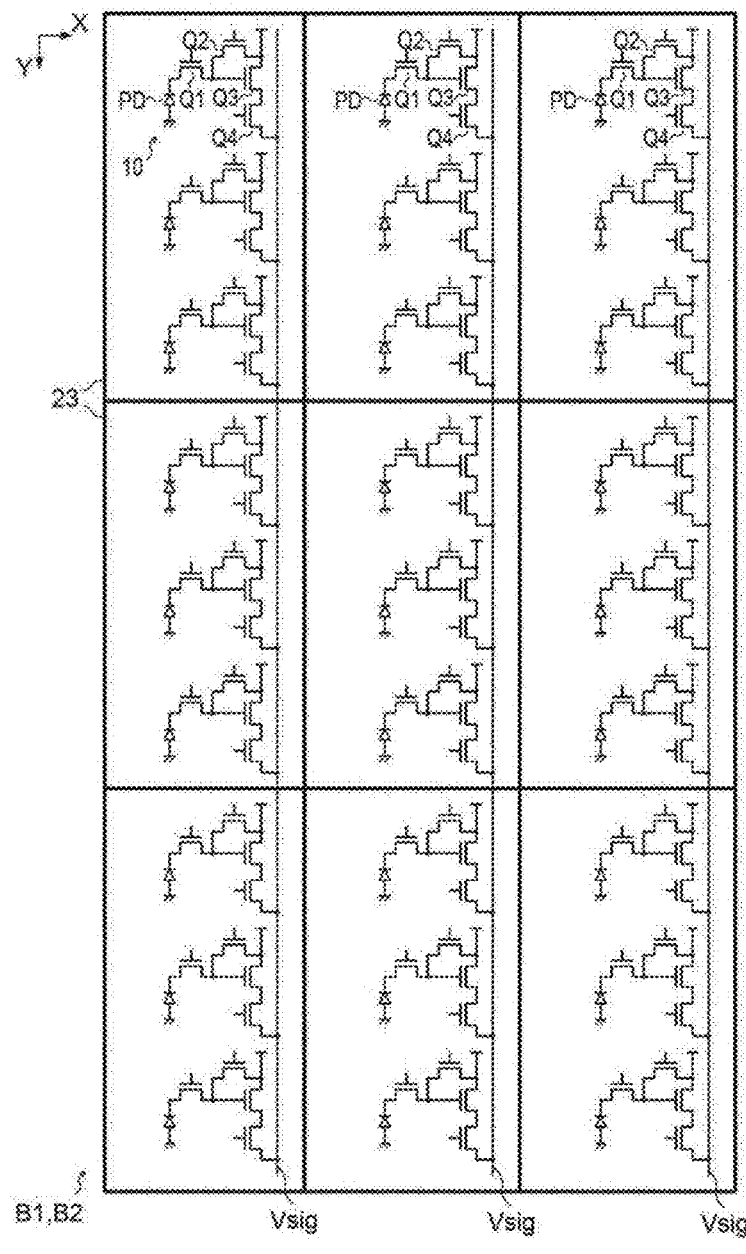
FIG. 35A is a circuit diagram illustrating a first example of an internal configuration of a pixel block.

As described above, in this embodiment, one pixel 10 that has not been selected and is not adjacently disposed is selected from each macro pixel 23 of the inside of a pixel block, and a product sum operation is performed for a read pixel signal and corresponding filter coefficients. FIG. 35A is a circuit diagram illustrating a first example of the internal configuration of pixel blocks B1 and B2, and FIG. 35B is a diagram illustrating one example of a pixel 10 that is selected from each macro pixel 23 of the inside of the pixel blocks B1 and B2.

Figure 35B:
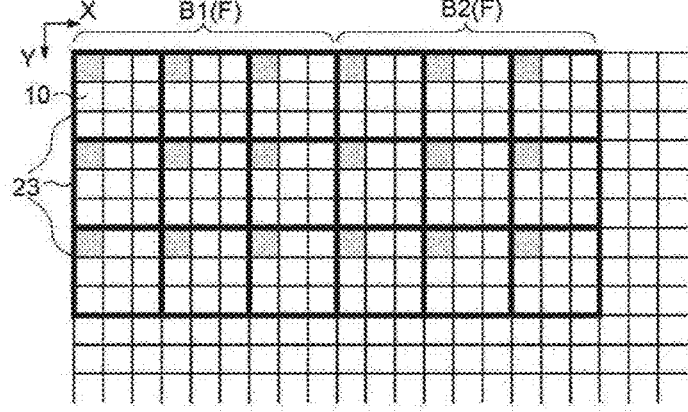
FIG. 35B is a diagram illustrating an example of a pixel selected from each macro pixel inside a pixel block.

Each of the pixel blocks B1 and B2 illustrated in FIGS. 35A and 35B has a total nine macro pixels 23 including three in the first direction X and three in the second direction Y, and three pixel columns disposed in the first direction X are connected to respective signal lines Vsig.

The pixel 10 of the inside of each macro pixel 23 has a photoelectric conversion unit PD, a transfer transistor Q1, a reset transistor Q2, an amplification transistor Q3, and a selection transistor Q4. In this specification, the reset transistor Q2, the amplification transistor Q3, and the selection transistor Q4 will be collectively referred to as a reading circuit. A drain of the selection transistor Q4 is connected to a common signal line Vsig extending in the second direction Y.

In the pixel blocks B1 and B2 illustrated in FIG. 35A, one pixel 10 is selected for each macro pixel 23. A pixel signal output from the selection transistor Q4 of the inside of the selected pixel 10 is transmitted to a corresponding signal line Vsig.

Figure 36A:
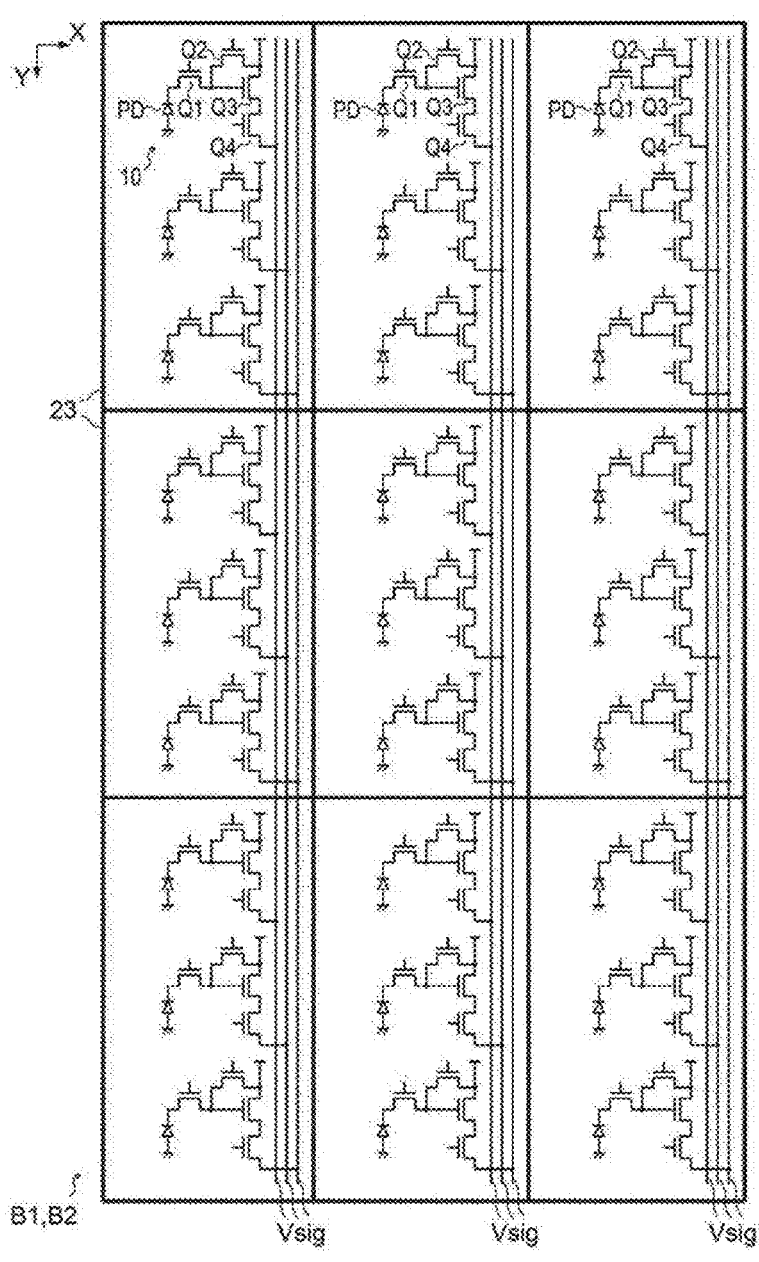
FIG. 36A is a circuit diagram illustrating a second example of an internal configuration of a pixel block.
Figure 36B:
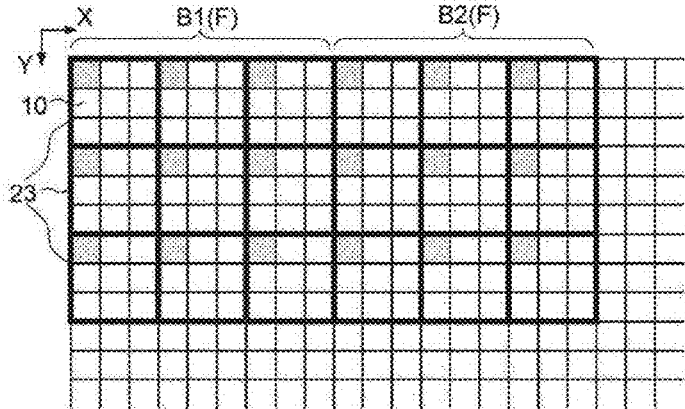
FIG. 36B is a diagram illustrating an example of a pixel selected from each macro pixel inside a pixel block.

FIG. 36A is a circuit diagram illustrating a second example of the internal configuration of pixel blocks B1 and B2, and FIG. 36B is a diagram illustrating an example of a pixel 10 selected from each macro pixel 23 of the inside of the pixel blocks B1 and B2. In FIG. 35A, although each of three pixel columns extending in the second direction Y has one separate signal line Vsig, each pixel column has three signal lines Vsig in FIG. 36A. The macro pixel 23 has three pixels 10 arranged in the second direction Y, and these pixels 10 are connected to respective signal lines Vsig.

In this way, by outputting pixel signals output from three pixels 10 arranged in the second direction Y inside the macro pixel 23 to respectively signal lines Vsig, pixel signals of a total of three pixels 10 selected from three macro pixels 23 arranged in the second direction Y inside the pixel blocks B1 and B2 can be output to three signal lines Vsig in parallel.

Figure 37A:
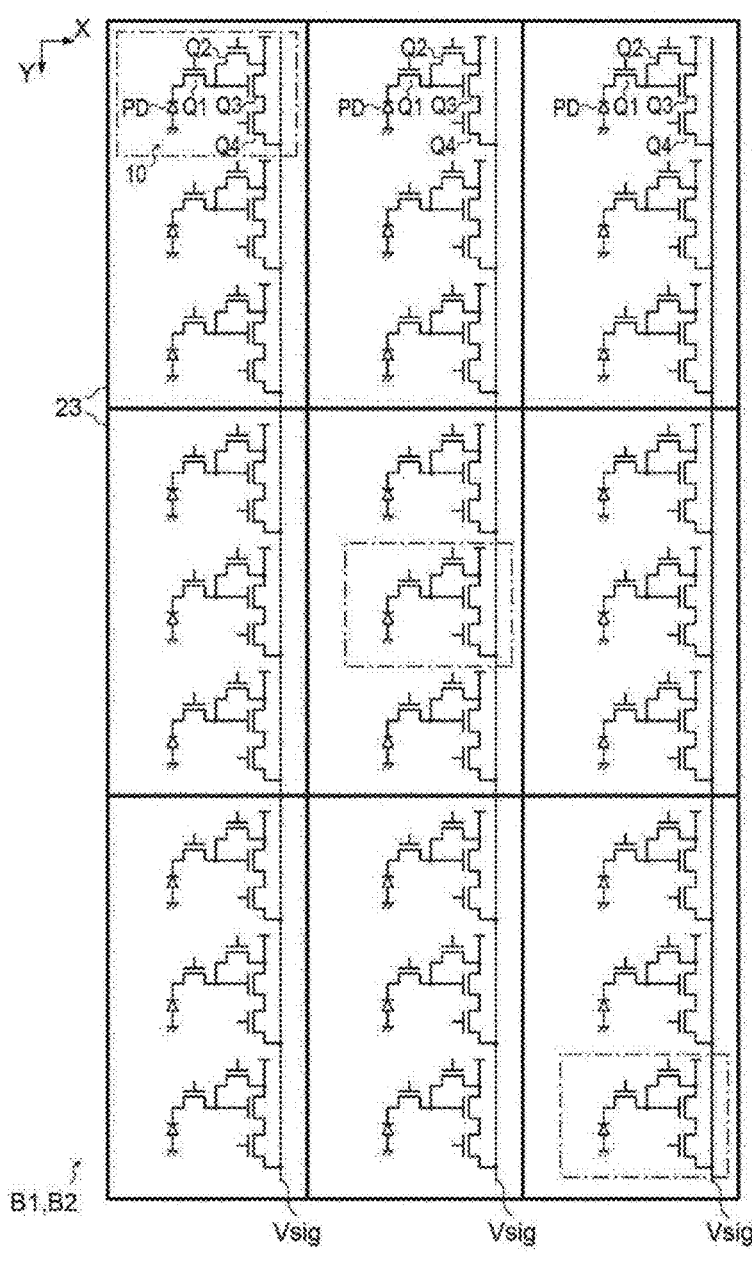
FIG. 37A is a circuit diagram illustrating a third example of an internal configuration of a pixel block.
Figure 37B:
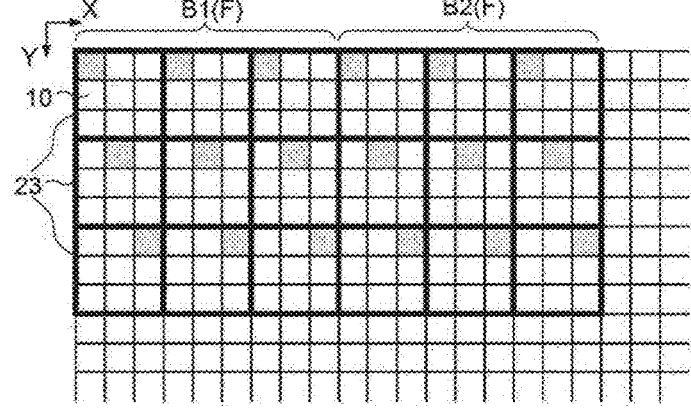
FIG. 37B is a diagram illustrating an example of a pixel selected from each macro pixel inside a pixel block.

FIG. 37A is a circuit diagram illustrating a third example of the internal configuration of pixel blocks B1 and B2, and FIG. 37B is a diagram illustrating an example of a pixel 10 selected from each macro pixel 23 of the inside of the pixel blocks B1 and B2. Although the circuit configuration illustrated in FIG. 37A is the same as that illustrated in FIG. 35A, a reading sequence of pixel signals is different from that illustrated in FIG. 35B. As in FIG. 37B, by selecting pixels 10 of which arrangement places in the first direction X are different from each other from three macro pixels 23 arranged in the second direction Y of the inside of pixel blocks B1 and B2, pixel signals of the selected three pixels 10 can be output to three signal lines Vsig in parallel.

As illustrated in FIG. 35B, a product-sum operation may be performed by reading pixel signals of the same pixel position inside each macro pixel 23, and, as illustrated in FIG. 37B, a product-sum operation may be performed by reading pixel signals of different pixel positions inside each macro pixel 23. In a case in which the method of reading pixel signals as illustrated in FIG. 37B is used, a plurality of pixel signals can be read in parallel from a plurality of signal lines Vsig, and a pixel signal can be read at a high speed.

Figure 38A:
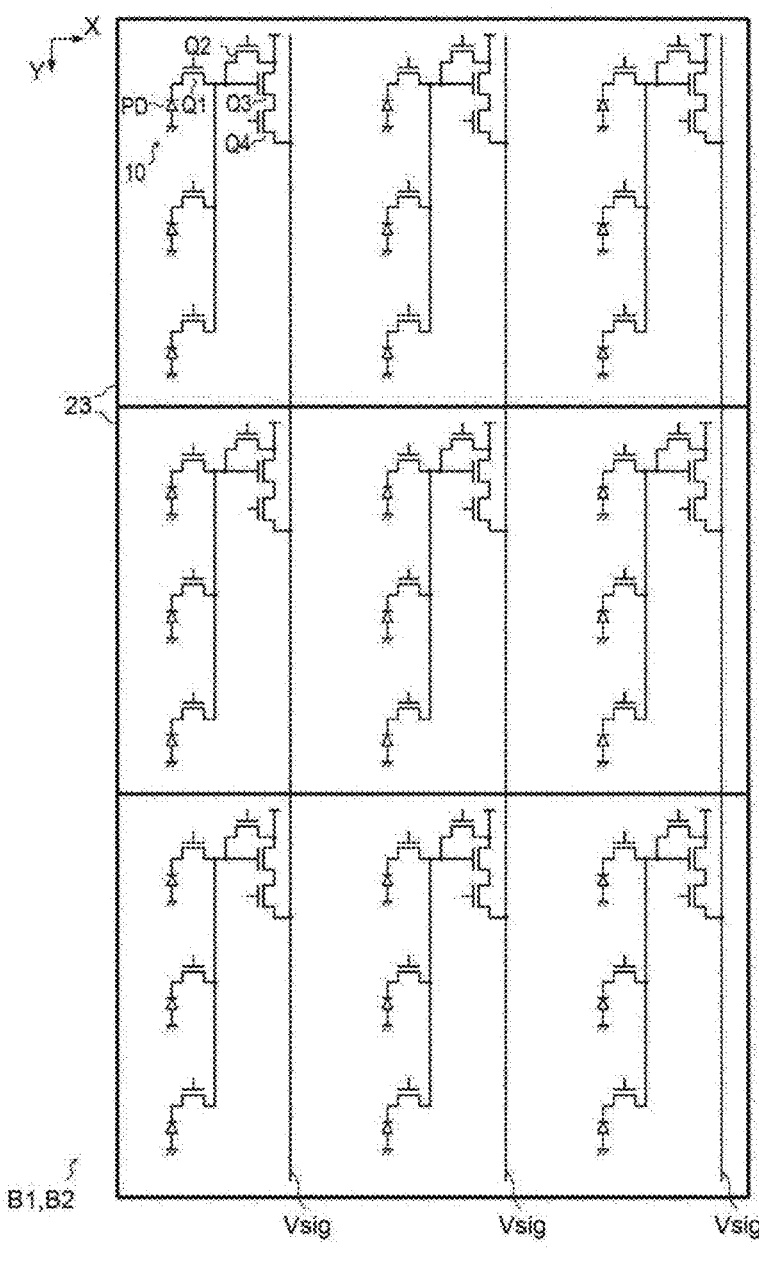
FIG. 38A is a circuit diagram illustrating a fourth example of an internal configuration of a pixel block.
Figure 38B:
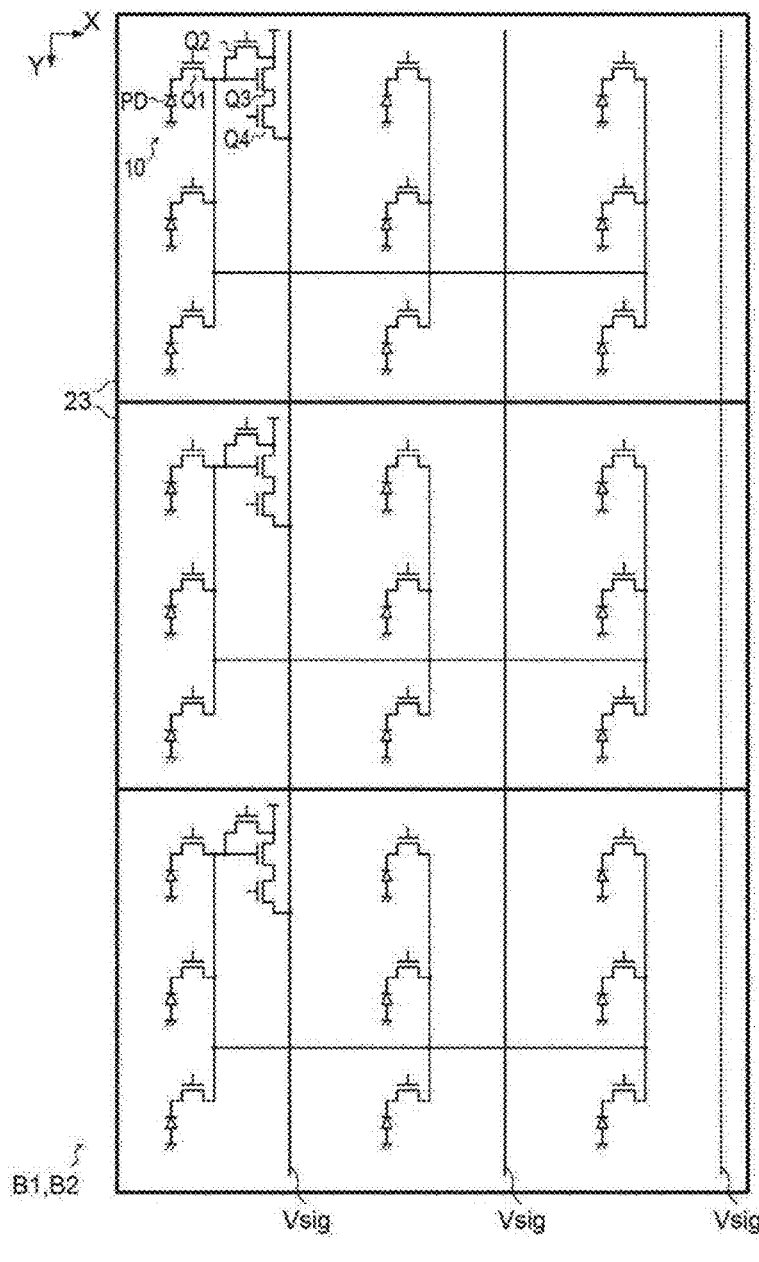
FIG. 38B is a circuit diagram illustrating one modified example of FIG. 38A.
Figure 38C:
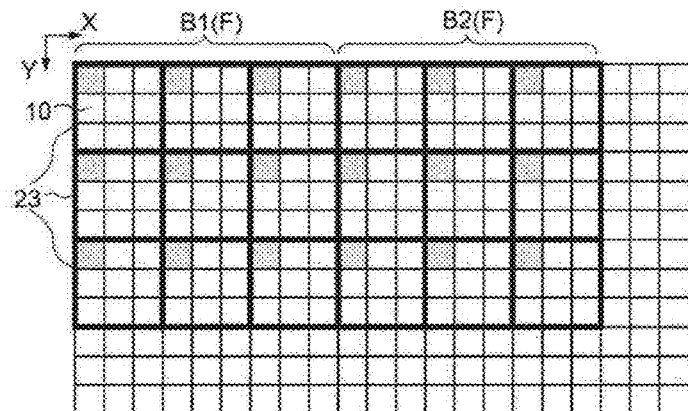
FIG. 38C is a diagram illustrating an example of a pixel selected from each macro pixel inside a pixel block.

FIG. 38A is a circuit diagram illustrating a fourth example of the internal configuration of pixel blocks B1 and B2, FIG. 38B is a circuit diagram illustrating one modified example of FIG. 38A, and FIG. 38C is a diagram illustrating an example of a pixel 10 selected from each macro pixel 23 of the inside of the pixel blocks B1 and B2.

As illustrated in FIG. 38C, one pixel 10 is selected and read from each macro pixel 23 of the inside of pixel blocks B1 and B2 at each time, and thus a reading circuit and a signal line Vsig may be shared among three pixels 10 arranged in the second direction Y inside the macro pixel 23 without causing any problem.

Thus, in FIG. 38A, in correspondence with three pixels 10 arranged in the second direction Y, three photoelectric conversion units PD and three transfer transistors Q1 are disposed. Such three pixels 10 share one reading circuit that is formed from the reset transistor Q2, the amplification transistor Q3, and the selection transistor Q4. In other words, three transfer transistors Q1 are connected to a common floating diffusion region FDFD. The reading circuit shared by three pixels 10 is connected to the signal line Vsig extending in the second direction Y. Three pixel columns arranged in the first direction X inside the pixel blocks B1 and B2 are connected to different signal lines Vsig.

FIG. 38B illustrates an example in which one reading circuit and the signal line Vsig are shared for each macro pixel 23. In the macro pixel 23, three pixels 10 are included in the first direction X, and three pixels 10 are included in the second direction Y, and thus one set of the reading circuit and the signal line Vsig is shared by nine pixels 10. The signal line Vsig is configured to be common to a signal line Vsig of a different macro pixel 23 arranged in the second direction Y.

The pixel blocks B1 and B2 illustrated in FIG. 38B, as in FIG. 38C, have a minimal circuit configuration according to selection of only one pixel 10 from each macro pixel 23.

Figure 39A:
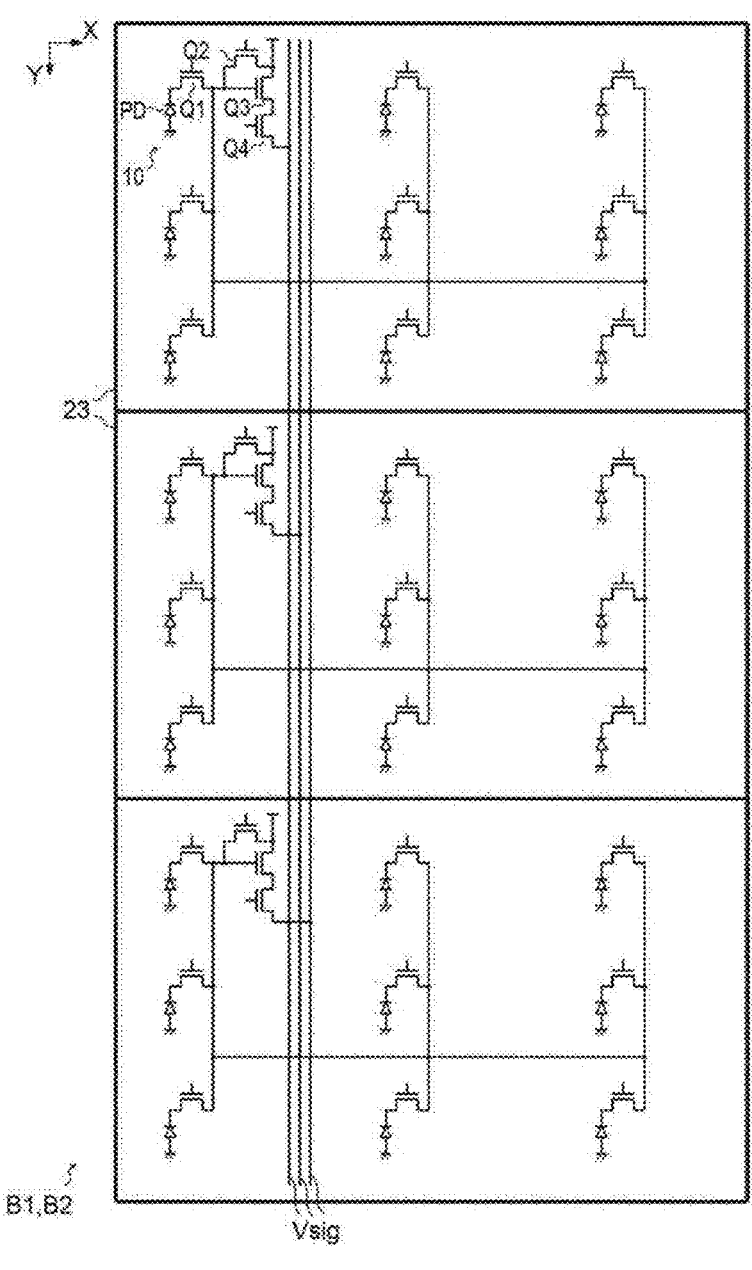
FIG. 39A is a circuit diagram illustrating a fifth example of an internal configuration of a pixel block.
Figure 39B:
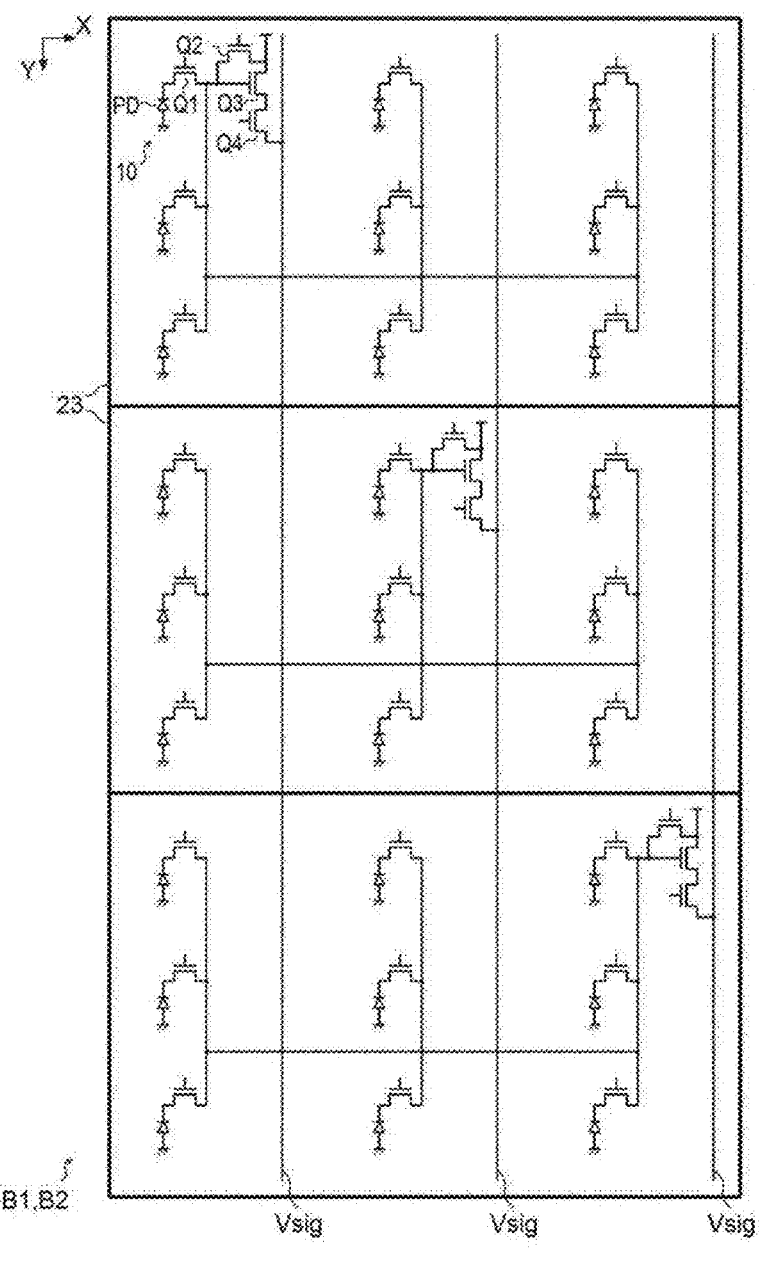
FIG. 39B is a circuit diagram illustrating one modified example of FIG. 39A.
Figure 39C:
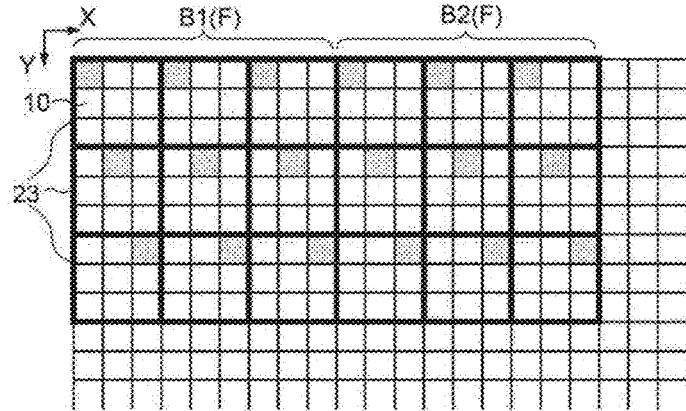
FIG. 39C is a diagram illustrating an example of a pixel selected from each macro pixel inside a pixel block.

FIG. 39A is a circuit diagram illustrating a fifth example of the internal configuration of pixel blocks B1 and B2, FIG. 39B is a circuit diagram illustrating one modified example of FIG. 39A, and FIG. 39C is a diagram illustrating an example of a pixel 10 selected from each macro pixel 23 of the inside of the pixel blocks B1 and B2.

Similar to FIG. 37B, FIG. 39C illustrates an example in which a pixel 10 of a pixel position deviating from three macro pixels 23 arranged in the second direction Y inside the pixel blocks B1 and B2 in the first direction X is selected. In this case, as illustrated in FIG. 39A, one reading circuit is shared by nine pixels 10 of the inside of the macro pixel 23, and three signal lines Vsig corresponding to three pixel rows arranged in the first direction X are disposed. In accordance with this, pixel signals of different pixel positions can be output in parallel from three macro pixels 23 arranged in the second direction Y to three signal lines Vsig.

In FIG. 39A, although a reading circuit and three signal lines Vsig are disposed in association with a pixel column of the left end inside the pixel blocks B1 and B2, as illustrated in FIG. 39B, for each pixel row, the reading circuit and the signal lines Vsig may be disposed at different places in the first direction X.

In the pixels 10 illustrated in FIGS. 39A and 39B, for each macro pixel 23 column of the inside of the pixel blocks B1 and B2, pixel signals of arbitrary pixel positions deviating in the first direction X can be read in parallel.

(Filter Coefficient at Time of Convolution Operation)

As described above, a product-sum operation of a pixel signal and filter coefficients may be performed inside the pixel 10 or may be performed on the signal line Vsig. In a case in which a product-sum operation is performed inside a pixel 10, by adjusting an exposure time, a process that is substantially the same as a multiplication process with filter coefficients may be performed inside the pixel 10. In addition, by disposing one or more subpixels inside the pixel 10 and increasing the amount of electric charge accumulated in the floating diffusion region FD, a process that is substantially the same as the multiplication process with filter coefficients may be performed inside the pixel 10.

As described above, the imaging device according to this embodiment repeats a product-sum operation by selecting two or more pixels 10 that have not been selected and are not adjacent to each other inside the pixel blocks B1 and B2, and thus the same pixel signal does not need to be read a plurality of number of times. Thus, a plurality of amplification transistors Q3 and a memory do not need to be disposed inside the pixel 10, and the pixel 10 size can be configured to be small. In addition, since the same pixel signal does not need to be read a plurality of number of times, filter coefficients can be arbitrarily changed every time the filter F is shifted, and a degree of freedom of a convolution operation can be increased.

<Application to Moving Body>

The technology of the present disclosure (the present technology) can be applied to various products. For example, the technology according to the present disclosure may be realized as a device mounted on any type of moving body such as an automobile, an electric automobile, a hybrid electric automobile, a motorcycle, a bicycle, a personal mobility device, an airplane, a drone, a ship, a robot, or the like.

Figure 40:
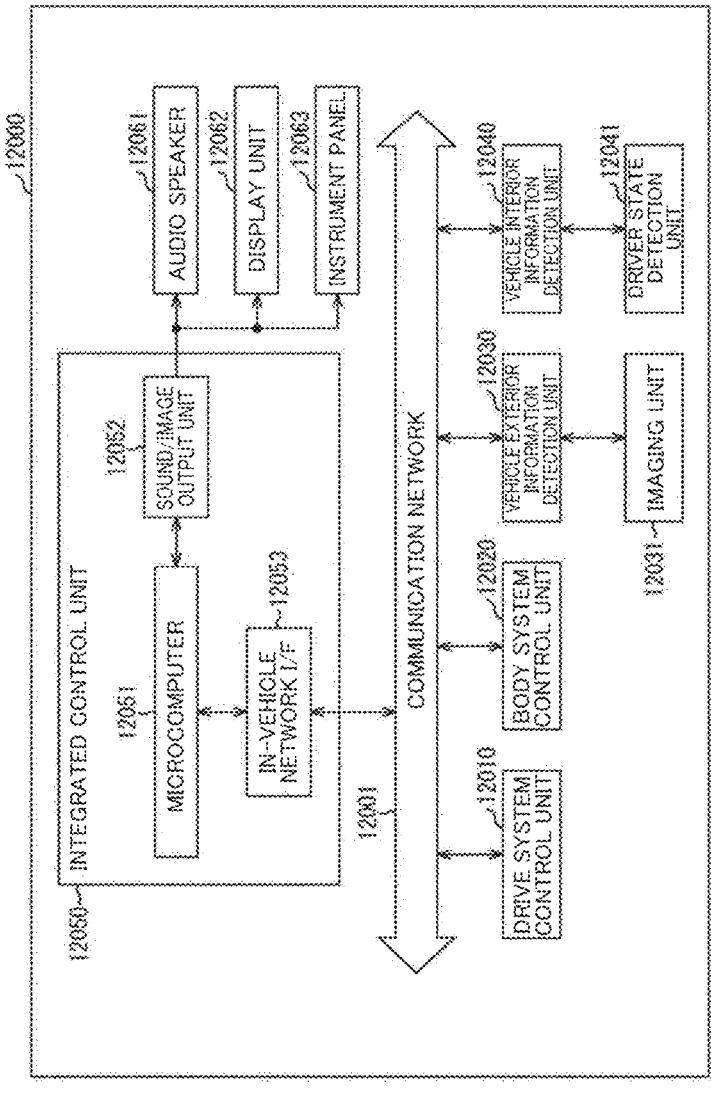
FIG. 40 is a block diagram illustrating an example of a schematic configuration of a vehicle control system.

FIG. 40 is a block diagram illustrating a schematic configuration example of a vehicle control system, which is an example of a moving body control system to which the technology according to the present disclosure can be applied.

A vehicle control system 12000 includes a plurality of electronic control units connected to each other over a communication network 12001. In the example illustrated in FIG. 40, the vehicle control system 12000 includes a drive system control unit 12010, a body system control unit 12020, a vehicle exterior information detection unit 12030, a vehicle interior information detection unit 12040, and an integrated control unit 12050. A microcomputer 12051, a sound/image output unit 12052, and an in-vehicle network interface (I/F) 12053 are illustrated as the functional configuration of the integrated control unit 12050.

The drive system control unit 12010 controls an operation of an apparatus related to a drive system of a vehicle according to various programs. For example, the drive system control unit 12010 functions as a driving force generator for generating a driving force of a vehicle such as an internal combustion engine or a driving motor, a driving force transmission mechanism for transmitting a driving force to wheels, a steering mechanism for adjusting a turning angle of a vehicle, and a control apparatus such as a braking apparatus that generates a braking force of a vehicle.

The body system control unit 12020 controls operations of various devices mounted in the vehicle body according to various programs. For example, the body system control unit 12020 functions as a control device of a keyless entry system, a smart key system, a power window device, or various lamps such as a headlamp, a back lamp, a brake lamp, a turn signal, and a fog lamp. In this case, radio waves transmitted from a portable device that substitutes for a key or signals of various switches may be input to the body system control unit 12020. The body system control unit 12020 receives inputs of the radio waves or signals and controls a door lock device, a power window device, and a lamp of the vehicle.

The vehicle exterior information detection unit 12030 detects information on the outside of the vehicle having the vehicle control system 12000 mounted thereon. For example, an imaging unit 12031 is connected to the vehicle exterior information detection unit 12030. The vehicle exterior information detection unit 12030 causes the imaging unit 12031 to capture an image of the outside of the vehicle and receives the captured image. The vehicle exterior information detection unit 12030 may perform object detection processing or distance detection processing for peoples, cars, obstacles, signs, and letters on the road on the basis of the received image.

The imaging unit 12031 is an optical sensor that receives light and outputs an electrical signal according to the amount of the received light. The imaging unit 12031 can also output the electrical signal as an image or distance measurement information. In addition, the light received by the imaging unit 12031 may be visible light or invisible light such as infrared light.

The vehicle interior information detection unit 12040 detects information on the inside of the vehicle. For example, a driver state detection unit 12041 that detects a driver's state is connected to the vehicle interior information detection unit 12040. The driver state detection unit 12041 includes, for example, a camera that captures an image of a driver, and the vehicle interior information detection unit 12040 may calculate a degree of fatigue or concentration of the driver or may determine whether or not the driver is dozing on the basis of detection information input from the driver state detection unit 12041.

The microcomputer 12051 can calculate control target values for the driving force generation device, the steering mechanism, or the braking device based on the information on the interior and exterior of the vehicle obtained by the vehicle exterior information detection unit 12030 or the vehicle interior information detection unit 12040, and output control commands to the drive system control unit 12010. For example, the microcomputer 12051 can perform coordinated control for the purpose of implementing functions of an advanced driver assistance system (ADAS) including vehicle collision avoidance, impact mitigation, following traveling based on an inter-vehicle distance, constant vehicle speed driving, vehicle collision warnings, and lane departure warning.

Further, the microcomputer 12051 can perform cooperative control for the purpose of automated driving or the like in which autonomous travel is performed without depending on operations of the driver, by controlling the driving force generator, the steering mechanism, or the braking device and the like on the basis of information about the surroundings of the vehicle, the information being acquired by the vehicle exterior information detection unit 12030 or the vehicle interior information detection unit 12040.

In addition, the microcomputer 12051 can output a control command to the body system control unit 12030 based on the information outside the vehicle acquired by the vehicle exterior information detection unit 12030. For example, the microcomputer 12051 can perform coordinated control for the purpose of antiglare such as switching a high beam to a low beam by controlling a headlamp according to a position of a preceding vehicle or an oncoming vehicle detected by the vehicle exterior information detection unit 12030.

The sound/image output unit 12052 transmits an output signal of at least one of sound and an image to an output device capable of visually or audibly notifying a passenger or the outside of the vehicle of information. In the example of FIG. 40, an audio speaker 12061, a display unit 12062, and an instrument panel 12063 are illustrated as examples of the output device. The display unit 12062 may include at least one of an on-board display and a head-up display, for example.

Figure 41:
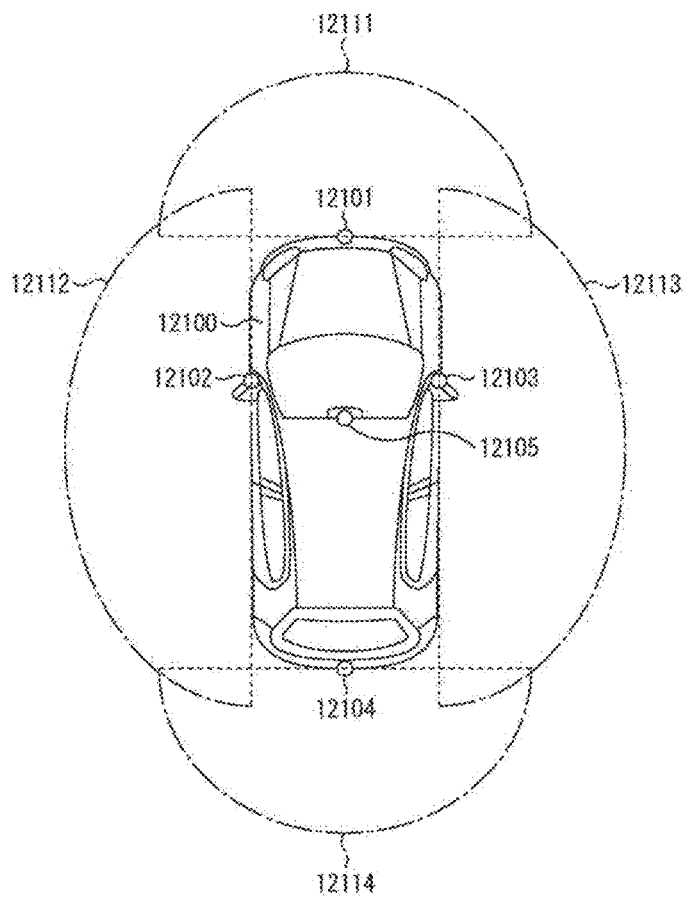
FIG. 41 is an explanatory diagram illustrating an example of positions at which a vehicle exterior information detection unit and an imaging unit are installed.

FIG. 41 is a diagram showing an example of an installation position of the imaging unit 12031.

In FIG. 41, the imaging unit 12031 includes imaging units 12101, 12102, 12103, 12104, and 12105.

The imaging units 12101, 12102, 12103, 12104, and 12105 are provided at, for example, positions of a front nose, side mirrors, a rear bumper, a back door, an upper portion of a vehicle internal front windshield, and the like of the vehicle 12100. The imaging unit 12101 provided on a front nose and the imaging unit 12105 provided in an upper portion of the vehicle internal front windshield mainly acquire images in front of the vehicle 12100. The imaging units 12102 and 12103 provided in the side mirrors mainly acquire images on the lateral sides of the vehicle 12100. The imaging unit 12104 included in the rear bumper or the back door mainly acquires an image of an area behind the vehicle 12100. The imaging unit 12105 included in the upper portion of the windshield inside the vehicle is mainly used for detection of a preceding vehicle, a pedestrian, an obstacle, a traffic signal, a traffic sign, a lane, or the like.

FIG. 41 illustrates an example of imaging ranges of the imaging units 12101 to 12104. An imaging range 12111 indicates an imaging range of the imaging unit 12101 provided at the front nose, imaging ranges 12112 and 12113 respectively indicate the imaging ranges of the imaging units 12102 and 12103 provided at the side-view mirrors, and an imaging range 12114 indicates the imaging range of the imaging unit 12104 provided at the rear bumper or the back door. For example, by superimposing image data captured by the imaging units 12101 to 12104, it is possible to obtain a bird's-eye view image viewed from the upper side of the vehicle 12100.

At least one of the imaging units 12101 to 12104 may have a function for obtaining distance information. For example, at least one of the imaging units 12101 to 12104 may be a stereo camera constituted by a plurality of imaging elements or may be an imaging element that has pixels for phase difference detection.

For example, the microcomputer 12051 can extract, particularly, a closest three-dimensional object on a path through which the vehicle 12100 is traveling, which is a three-dimensional object traveling at a predetermined speed (for example, 0 km/h or higher) in the substantially same direction as the vehicle 12100, as a preceding vehicle by obtaining a distance to each three-dimensional object in the imaging ranges 12111 to 12114 and temporal change in the distance (a relative speed with respect to the vehicle 12100) based on distance information obtained from the imaging units 12101 to 12104. The microcomputer 12051 can also set a following distance to the preceding vehicle to be maintained in advance and perform automatic brake control (including following stop control) and automatic acceleration control (including following start control). It is therefore possible to perform coordinated control for the purpose of, for example, automated driving in which the vehicle travels in an automated manner without requiring the driver to perform operations.

For example, the microcomputer 12051 can classify and extract three-dimensional data regarding three-dimensional objects into two-wheeled vehicles, normal vehicles, large vehicles, pedestrians, and other three-dimensional objects such as electric poles based on distance information obtained from the imaging units 12101 to 12104 and can use the three-dimensional data to perform automated avoidance of obstacles. For example, the microcomputer 12051 differentiates surrounding obstacles of the vehicle 12100 into obstacles which can be viewed by the driver of the vehicle 12100 and obstacles which are difficult to view. Then, the microcomputer 12051 determines a collision risk indicating the degree of risk of collision with each obstacle, and when the collision risk is equal to or higher than a set value and there is a possibility of collision, an alarm is output to the driver through the audio speaker 12061 or the display unit 12062, forced deceleration or avoidance steering is performed through the drive system control unit 12010, and thus it is possible to perform driving support for collision avoidance.

At least one of the imaging units 12101 to 12104 may be an infrared camera that detects infrared rays. For example, the microcomputer 12051 can recognize a pedestrian by determining whether there is a pedestrian in the captured image of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating an outline of an object to determine whether or not the object is a pedestrian. When the microcomputer 12051 determines that there is a pedestrian in the captured images of the imaging units 12101 to 12104 and the pedestrian is recognized, the sound/image output unit 12052 controls the display unit 12062 so that a square contour line for emphasis is superimposed and displayed with the recognized pedestrian. In addition, the sound/image output unit 12052 may control the display unit 12062 so that an icon indicating a pedestrian or the like is displayed at a desired position.

An example of the vehicle control system to which the technology according to the present disclosure can be applied has been described above. The technology according to the present disclosure may be applied to the imaging unit 12031 and the like among the above-described configurations. Specifically, the imaging device 1 of the present disclosure can be applied to the imaging unit 12031. By applying the technology according to the present disclosure to the imaging unit 12031, a clearer captured image can be obtained, which makes it possible to reduce driver fatigue.

The present technology can also take on the following configurations.

(1) An imaging device including a pixel array unit in which a plurality of pixels that perform photoelectric conversion are arranged in directions in two dimensions; and an arithmetic operation unit configured to repeat a product-sum operation by selecting two or more of the pixels that have not been selected and are not adjacent to each other inside the pixel array unit.

(2) The imaging device described in (1), in which the pixel array unit is divided into a plurality of macro pixels having two or more of the pixels adjacent to each other as its unit, and the arithmetic operation unit repeats a process of performing a product-sum operation by selecting one pixel that has not been selected and is not adjacently disposed from each of two or more of the macro pixels.

(3) The imaging device described in (2), in which the arithmetic operation unit performs a convolution operation with a filter in units of pixel blocks including two or more of the macro pixels and repeats a process of performing a product-sum operation with corresponding filter coefficients inside the filter by sequentially selecting pixels that have not been selected and are not adjacently disposed from the macro pixels inside the pixel block.

(4) The imaging device described in (3), in which, when a size of the filter is N in a first direction and is M in a second direction intersecting with the first direction, a shift amount of the pixels in the first direction is K, and a shift amount of the pixels in the second direction is L (here, N, M, K, and L are integers equal to or greater than 1), the number of pixels inside the macro pixel is equal to or greater than $(N/K)\times(M/L)$.

(5) The imaging device described in any one of (2) to (4), further including color filters arranged in association with the pixels.

(6) The imaging device described in (5), in which each of the color filters has a plurality of color filter units that transmit light of which wavelength bands are different from each other.

(7) The imaging device described in any one of (2) to (4), further including color filters arranged in association with the pixels, in which the color filter has a color filter unit for each of the macro pixels, and two of the color filter units corresponding to two of the macro pixels adjacent to each other have different wavelength bands of light to be transmitted.

(8) The imaging device described in (6) or (7), in which the color filter includes at least one of a color filter unit that transmits light of a visible light wavelength band, a color filter unit that transmits light of an infrared light wavelength band, and a color filter unit that performs polarization control.

(9) The imaging device described in any one of (2) to (8), in which the macro pixel includes two or more photoelectric conversion units arranged in a direction in which signal lines that transmit pixel signals extend; two or more transfer transistors connected to the two or more photoelectric conversion units; and two or more reading circuits connected to the two or more transfer transistors, the two or more reading circuits are connected to the signal line that is configured to be common, and the two or more reading circuits each output the pixel signals to the signal lines at different timings.

(10) The imaging device described in any one of (2) to (8), in which the macro pixel includes two or more photoelectric conversion units arranged in a direction in which signal lines that transmit pixel signals extend; two or more transfer transistors connected to the two or more photoelectric conversion units; and two or more reading circuits connected to the two or more transfer transistors, the two or more reading circuits are each connected to the separate signal lines, and the two or more reading circuits output the pixel signals in parallel to the corresponding signal lines.

(11) The imaging device described in any one of (2) to (8), in which the macro pixel includes a plurality of photoelectric conversion units arranged in each of a first direction and a second direction intersecting with each other; and a plurality of signal lines extending in the second direction, and the plurality of photoelectric conversion units arranged in different stages in the second direction output pixel signals in parallel to corresponding signal lines.

(12) The imaging device described in any one of (2) to (8), in which the macro pixel includes two or more photoelectric conversion units arranged in a direction in which signal lines that transmit pixel signals extend; two or more transfer transistors connected to the two or more photoelectric conversion units; and a reading circuit shared by the two or more photoelectric conversion units and the two or more transfer transistors.

(13) The imaging device described in any one of (2) to (8), in which the macro pixel includes a plurality of photoelectric conversion units arranged in each of a first direction and a second direction intersecting with each other; a plurality of signal lines extending in the second direction; and a plurality of reading circuits connected to the plurality of signal lines, and each of the plurality of reading circuits is shared by the plurality of photoelectric conversion units arranged along the corresponding signal lines.

(14) The imaging device described in any one of (2) to (8), in which the macro pixel includes a plurality of photoelectric conversion units arranged in each of a first direction and a second direction intersecting with each other; a plurality of signal lines extending in the second direction; and one reading circuit connected to the plurality of signal lines and shared by all the pixels of the inside of the macro pixel.

(15) The imaging device described in any one of (1) to (14), in which, inside the pixel, the pixel signal acquired through photoelectric conversion is weighted for a convolution operation and then is output.

(16) The imaging device described in any one of (1) to (14), further including an analog-to-digital converter that converts the pixel signal acquired through photoelectric conversion into a digital pixel signal, in which the arithmetic operation unit performs a product sum operation for the digital pixel signal.

(17) The imaging device described in any one of (1) to (14), further including an analog-to-digital converter that converts a signal acquired by performing a product-sum operation for the pixel signal acquired through photoelectric conversion from analog to digital.

(18) The imaging device described in any one of (1) to (15), in which the pixel outputs a digital pixel signal acquired by performing analog-to-digital conversion of the pixel signal.

(19) The imaging device described in any one of (1) to (15), in which the pixel outputs the pixel signal corresponding to a luminance change.

(20) An electronic apparatus including an imaging device configured to output a pixel signal acquired through photoelectric conversion; and a signal processing unit configured to perform signal processing for the pixel signal, in which the imaging device includes a pixel array unit in which a plurality of pixels that perform photoelectric conversion are arranged in directions in two dimensions; and an arithmetic operation unit configured to repeat a process of performing a product-sum operation by selecting two or more of the pixels that have not been selected and are not adjacent to each other inside the pixel array unit.

(21) An information processing method in which a process of performing a product-sum operation by selecting two or more pixels that have not been selected and are not adjacent to each other inside a pixel array unit, in which a plurality of pixels that perform photoelectric conversion are arranged in directions in two dimensions, is repeated.

Aspects of the present disclosure are not limited to the aforementioned individual embodiments and include various modifications that those skilled in the art can achieve, and effects of the present disclosure are also not limited to the details described above. In other words, various additions, modifications, and partial deletion can be made without departing from the conceptual idea and the gist of the present disclosure that can be derived from the details defined in the claims and the equivalents thereof.

REFERENCE SIGNS LIST

1 Imaging device
10 Pixel
11 Pixel array unit
12 Vertical drive unit
13 AD conversion unit
14 Horizontal drive unit
15 Control unit
16 Signal processing circuit
17 Memory
18 Input/output unit
19 Product-sum arithmetic operation unit
21 Feature quantity extractor
22 Identifying device
23 Macro pixel
31 Network unit
32 Network unit
41 Photoelectric conversion film
42 Transparent electrode
48 Lower electrode
51 Current-voltage conversion unit
52 Source follower circuit
58 Differential circuit
54 Comparator
62 Comparator
63 Counter
64 Capacitor

The invention claimed is:

1. An imaging device comprising:
a pixel array unit in which a plurality of pixels that perform photoelectric conversion are arranged in directions in two dimensions; and
circuitry configured to repeat a product-sum operation by selecting two or more of the pixels that have not been selected in a previous product-sum operation and that are not adjacent to each other inside the pixel array unit such that the same pixel is not selected a plurality of times in two or more product-sum operations.

2. The imaging device according to claim 1,
wherein the pixel array unit is divided into a plurality of macro pixels having two or more of the pixels adjacent to each other as a unit, and
wherein the circuitry is configured to repeat a process of performing the product-sum operation by selecting one pixel that has not been selected and is not adjacently disposed from each of two or more of the macro pixels.

3. The imaging device according to claim 2, wherein the circuitry is configured to:
perform a convolution operation with a filter in units of pixel blocks including two or more of the macro pixels, and repeat a process of performing the product-sum operation with corresponding filter coefficients inside the filter by sequentially selecting pixels that have not been selected and are not adjacently disposed from the macro pixels inside the pixel block.

4. The imaging device according to claim 3, wherein, when a size of the filter is N in a first direction and is M in a second direction intersecting with the first direction, a shift amount of the pixels in the first direction is K, and a shift amount of the pixels in the second direction is L (here, N, M, K, and L are integers equal to or greater than 1), a number of pixels inside the macro pixel is equal to or greater than (N/K)×(M/L).

5. The imaging device according to claim 2, further comprising color filters arranged in association with the pixels.

6. The imaging device according to claim 5, wherein each of the color filters has a plurality of color filter units that transmit light of which wavelength bands are different from each other.

7. The imaging device according to claim 2, further comprising color filters arranged in association with the pixels, wherein the color filter has a color filter unit for each of the macro pixels, and wherein two of the color filter units corresponding to two of the macro pixels adjacent to each other have different wavelength bands of light which are transmitted.

8. The imaging device according to claim 6, wherein the color filter includes at least one of a color filter unit that transmits light of a visible light wavelength band, a color filter unit that transmits light of an infrared light wavelength band, or a color filter unit that performs polarization control.

9. The imaging device according to claim 2, wherein the macro pixel includes:

two or more photoelectric conversion units arranged in a direction in which signal lines that transmit pixel signals extend;

two or more transfer transistors connected to the two or more photoelectric conversion units; and two or more reading circuits connected to the two or more transfer transistors, wherein the two or more reading circuits are connected to one of the signal lines that is configured to be common, and wherein the two or more reading circuits each output the pixel signals to the signal lines at different timings.

10. The imaging device according to claim 2, wherein the macro pixel includes:

two or more photoelectric conversion units arranged in a direction in which signal lines that transmit pixel signals extend;

two or more transfer transistors connected to the two or more photoelectric conversion units; and two or more reading circuits connected to the two or more transfer transistors, wherein the two or more reading circuits are each connected to separate signal lines, and wherein the two or more reading circuits output the pixel signals in parallel to the corresponding signal lines.

11. The imaging device according to claim 2, wherein the macro pixel includes:

a plurality of photoelectric conversion units arranged in each of a first direction and a second direction intersecting with each other; and a plurality of signal lines extending in the second direction, and wherein the plurality of photoelectric conversion units arranged in different stages in the second direction output pixel signals in parallel to corresponding signal lines.

12. The imaging device according to claim 2, wherein the macro pixel includes:

two or more photoelectric conversion units arranged in a direction in which signal lines that transmit pixel signals extend;

two or more transfer transistors connected to the two or more photoelectric conversion units; and a reading circuit shared by the two or more photoelectric conversion units and the two or more transfer transistors.

13. The imaging device according to claim 2, wherein the macro pixel includes:

a plurality of photoelectric conversion units arranged in each of a first direction and a second direction intersecting with each other;

a plurality of signal lines extending in the second direction; and a plurality of reading circuits connected to the plurality of signal lines, and wherein each of the plurality of reading circuits is shared by the plurality of photoelectric conversion units arranged along the corresponding signal lines.

14. The imaging device according to claim 2, wherein the macro pixel includes:

a plurality of photoelectric conversion units arranged in each of a first direction and a second direction intersecting with each other;

a plurality of signal lines extending in the second direction; and one reading circuit connected to the plurality of signal lines and shared by all the pixels of the inside of the macro pixel.

15. The imaging device according to claim 1, wherein, inside the pixel, a pixel signal acquired through the photoelectric conversion is weighted for a convolution operation and then is output.

16. The imaging device according to claim 1, further comprising an analog-to-digital converter that converts a pixel signal acquired through the photoelectric conversion into a digital pixel signal, wherein the circuitry is configured to perform the product-sum operation for the digital pixel signal.

17. The imaging device according to claim 1, further comprising an analog-to-digital converter that converts a signal acquired by performing the product-sum operation for a pixel signal acquired through the photoelectric conversion from analog to digital.

18. The imaging device according to claim 1, wherein the pixel outputs a digital pixel signal acquired by performing analog-to-digital conversion of a pixel signal acquired through the photoelectric conversion.

19. The imaging device according to claim 1, wherein the pixel outputs a pixel signal acquired through the photoelectric conversion corresponding to a luminance change.

20. An electronic apparatus comprising:

an imaging device configured to output a pixel signal acquired through photoelectric conversion; and a signal processing unit configured to perform signal processing for the pixel signal, wherein the imaging device includes:

a pixel array unit in which a plurality of pixels that perform photoelectric conversion are arranged in directions in two dimensions; and circuitry configured to repeat a process of performing a product-sum operation by selecting two or more of the pixels that have not been selected in a previous product-sum operation and that are not adjacent to each other inside the pixel array unit such that the same pixel is not selected a plurality of times in two or more product-sum operations.

21. An information processing method, comprising:

repeatedly performing a product-sum operation by selecting two or more pixels that have not been selected in a previous product-sum operation and that are not adjacent to each other inside a pixel array unit in which a plurality of pixels that perform photoelectric conversion are arranged in directions in two dimensions such that the same pixel is not selected a plurality of times in two or more product-sum operations.

\* \* \* \* \*